US012655806B2

(12) United States Patent
Kolhouse et al.

(10) Patent No.: US 12,655,806 B2
(45) Date of Patent: Jun. 16, 2026

(54) ENGINE BRAKING MODE SELECTION SYSTEMS AND METHODS

(71) Applicant: Cummins Inc., Columbus, IN (US)

(72) Inventors: J. Steven Kolhouse, Columbus, IN (US); Jonathan A. Dickson, Columbus, IN (US); Lyle E. Kocher, Whiteland, IN (US); Jennifer Kay Light-Holets, Greenwood, IN (US); Michael J. Ruth, Franklin, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/963,339

(22) Filed: Nov. 27, 2024

(65) Prior Publication Data

US 2025/0179966 A1 Jun. 5, 2025

Related U.S. Application Data

(60) Provisional application No. 63/604,700, filed on Nov. 30, 2023.

(51) Int. Cl.
*F02D 9/06* (2006.01)
*F02D 13/04* (2006.01)

(52) U.S. Cl.
CPC ............... *F02D 9/06* (2013.01); *F02D 13/04* (2013.01)

(58) Field of Classification Search
CPC ........ F02D 9/06; F02D 13/04; F02D 41/3058; F02D 41/12; F02D 2200/0802
See application file for complete search history.

(56) References Cited

U.S. PATENT DOCUMENTS

| | | | | |
|---|---|---|---|---|
| 7,380,396 | B2 | 6/2008 | Kresse | |
| 9,567,890 | B2 | 2/2017 | Schmitt et al. | |
| 11,326,533 | B2 * | 5/2022 | Stretch | F02D 41/029 |
| 11,391,223 | B2 * | 7/2022 | Robel | F02D 41/1446 |
| 11,440,528 | B2 | 9/2022 | Koti et al. | |
| 11,454,179 | B2 | 9/2022 | Schroeder et al. | |
| 2007/0186538 | A1 | 8/2007 | Dollmeyer et al. | |

(Continued)

FOREIGN PATENT DOCUMENTS

| | | | | |
|---|---|---|---|---|
| EP | 2 411 646 B1 | | 2/2012 | |
| WO | WO-2010110700 A1 | * | 9/2010 | F02D 41/0245 |

OTHER PUBLICATIONS https://www.jacobsvehiclesystems.com/news-events/jacobs-introduces-15-stroke-hpd-high-power-density-engine-brake.

*Primary Examiner* — Hung Q Nguyen
(74) *Attorney, Agent, or Firm* — Foley & Lardner LLP

(57) ABSTRACT

A system includes an aftertreatment system coupled to an engine and a controller communicably coupled to the engine and the aftertreatment system, the controller is configured to perform operations. The operations include receiving an engine braking request, and, responsive to receiving the engine braking request, enabling an engine braking operation whereby at least one engine braking mode of a plurality of engine braking modes is enabled and implemented. The operations include receiving a temperature value regarding a temperature of the aftertreatment system, comparing the temperature value to a first threshold or a second threshold, and selecting and implementing one of the one or more engine braking modes based on comparing the temperature value to the first threshold or the second threshold.

20 Claims, 6 Drawing Sheets

(56) References Cited

U.S. PATENT DOCUMENTS

| | | | | |
|---|---|---|---|---|
| 2007/0214772 | A1* | 9/2007 | England | F02D 41/086<br>60/285 |
| 2008/0210197 | A1* | 9/2008 | Smith | F02D 9/06<br>123/321 |

* cited by examiner

ENGINE BRAKING MODE SELECTION SYSTEMS AND METHODS

CROSS-REFERENCE TO RELATED APPLICATION

This Application claims the benefit of and priority to U.S. Provisional Application No. 63/604,700, filed Nov. 30, 2023, which is incorporated herein by reference in its entirety and for all purposes.

TECHNICAL FIELD

The present disclosure relates to systems and methods for engine braking mode selection and automatic or nearly automatic implementation.

BACKGROUND

Engine braking is a technique used in vehicles to slow down or control speed by manipulating an engine's internal components. In certain engine systems, engine braking may be achieved by opening the throttle and allowing the engine to work against itself, the resulting resistance reduces the vehicle's speed without relying on friction-based braking mechanisms, helping to extend friction brake life. In other engine systems, compression release engine braking may be utilized to retard engine forces and slow the vehicle. Engine braking may be used on downhill slopes or in situations where additional braking (e.g., braking beyond the braking force of a friction-based braking mechanism) is desired.

SUMMARY

One embodiment relates to a system. The system includes an aftertreatment system fluidly coupled to an engine and a controller communicably coupled to the engine and the aftertreatment system, the controller including at least one processor coupled to at least one memory device storing instructions that, when executed by the at least one processor, cause the controller to perform operations. The operations include receiving an engine braking request; responsive to receiving the engine braking request, enabling an engine braking operation whereby at least one engine braking mode of a plurality of engine braking modes is enabled and implemented; receiving a temperature value regarding a temperature of the aftertreatment system; comparing the temperature value to a first threshold or a second threshold; and selecting and implementing one of the one or more engine braking modes based on comparing the temperature value to the first threshold or the second threshold.

Another embodiment relates to a method. The method includes: receiving, by a controller, an engine braking request for an engine; responsive to receiving the engine braking request, enabling an engine braking operation whereby at least one engine braking mode of a plurality of engine braking modes is enabled and implemented; receiving, by the controller, a braking power demand value regarding a braking power for the engine braking operation; identifying, by the controller, one or more engine braking modes of the plurality of engine braking modes, the one or more engine braking modes satisfying the braking power demand value; receiving, by the controller, a temperature value regarding a temperature of an aftertreatment system, the aftertreatment system coupled to the engine; comparing, by the controller, the temperature value to a first threshold or a second threshold; and selecting and implementing, by the controller, one of the one or more engine braking modes based on comparing the temperature value to the first threshold or the second threshold.

Another embodiment relates to a non-transitory computer-readable medium storing instructions that, when executed by one or more processors of a processing circuit, cause the processing circuit to perform operations. The operations include: receiving an engine braking request for an engine; receiving a braking power demand value regarding a braking power for the engine braking operation; receiving one or more engine braking modes of a plurality of engine braking modes, the one or more engine braking modes satisfying the braking power demand value; receiving a temperature value regarding a temperature of an aftertreatment system, the aftertreatment system coupled to the engine; and selecting and implementing one of the one or more engine braking modes based on comparing the temperature value to a first threshold or a second threshold.

Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Figure 1:
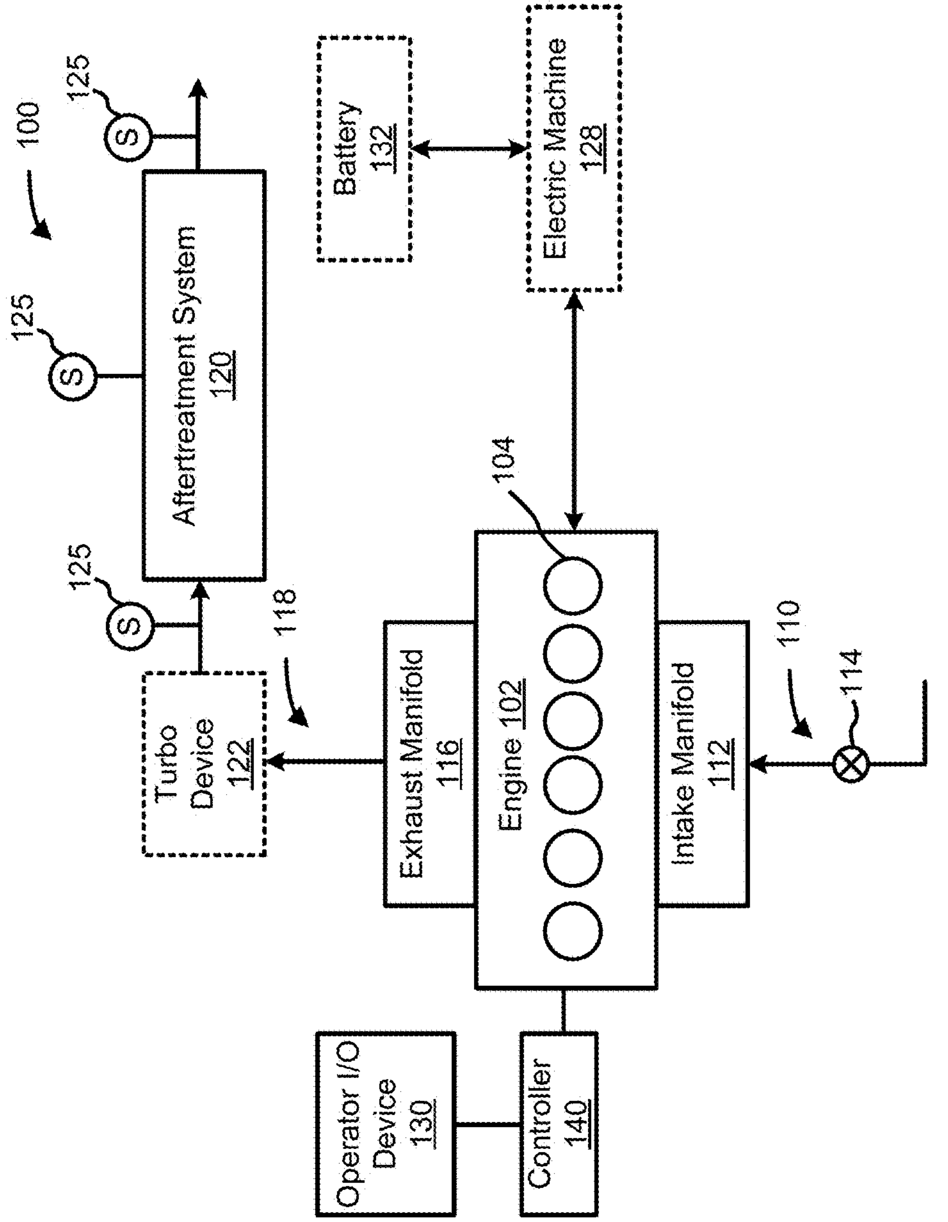
FIG. 1 is a block diagram of a system, according to an example embodiment.

Following below are more detailed descriptions of various concepts related to, and implementations of, methods, apparatuses, computer-readable media, and systems for enabling and implementing an automatic or nearly automatic engine braking mode selection for an engine system. According to various example embodiments, an engine braking mode may be selected by a controller of the engine system from a plurality of engine braking modes based on a temperature of an aftertreatment system. In other embodiments, the engine braking mode may be selected by the controller based on a braking power demand value (e.g., an amount of braking power demanded by a user, such as operator of the engine system). Before turning to the Figures, which illustrate certain exemplary embodiments in detail, it should be understood that the present disclosure is not limited to the details or methodology set forth in the description or illustrated in the Figures. It should also be understood that the terminology used herein is for the purpose of description only and should not be regarded as limiting.

As described herein, an engine system may include an engine and an exhaust aftertreatment system in exhaust gas receiving communication with the engine. The exhaust aftertreatment system may include one or more components, such as a particulate filter configured to remove particulate matter, such as soot, from exhaust gas flowing in the exhaust gas conduit system, a dosing module or system (e.g., comprising a doser) configured to supply a dosing fluid to the exhaust gas flowing in the aftertreatment system, and one or more catalyst devices configured to facilitate conversion of the exhaust gas constituents (e.g., nitrogen oxides, NOx, sulfur oxides, SOx, etc.) to less harmful elements (e.g., water, nitrogen, $N_2$, etc.), such as an oxidation catalyst, a selectively catalytic reduction (SCR) system, a three-way catalyst, and so on.

To mitigate harmful or potentially harmful exhaust emissions, such as NOx, it is desirable to achieve and maintain a target temperature within the aftertreatment system of an engine system. Various controls to achieve the target temperature including "get warm" and "stay warm" aftertreatment methods may be used. For example, these methods may mitigate the effect of relatively cold air flowing through the aftertreatment system during certain operating conditions, such as light load operating conditions or cold start conditions.

Engine braking (via compression release) is another condition which can cause a flow relatively cold air through an aftertreatment system. Conventional methods to minimize the cold-air flow during engine braking may include engine braking with a subset of engine cylinders (e.g., less than a total amount of cylinders). However, such a method may not be capable of providing sufficient engine braking performance.

Engine braking modes may include four-stroke and two-stroke techniques. A four-stroke engine braking mode may be a "normal" engine braking mode. In a four-stroke engine braking mode, no fuel is injected during the compression stroke, and one (or more) exhaust valves are opened as the piston approaches top dead center in order to release the compressed air charge within the cylinder. For example, the four-stroke has one intake event and one exhaust event in this order: normal intake event during intake stroke, extra exhaust event during compression stroke, nothing during power stroke, and no exhaust during exhaust stroke (because all the gas was already exhausted during the compression stroke).

A two-stroke braking mode includes the same process during the compression stroke, but also includes a similar approach during the exhaust stroke, whereby the exhaust valves are opened to optimized for braking performance over exhaust flow. For example, the two-stroke has two intake events and two exhaust events in this order: normal intake event during an intake stroke, an extra exhaust event during the compression stroke, an extra intake event during the power stroke, and a normal exhaust during the exhaust stroke. The two-stroke braking results in an increase in the flow of cold air through the exhaust gas aftertreatment system.

A 1.5-stroke braking mode increases the braking performance across a range of engine speeds, with greater improvements realized at lower engine speeds. The 1.5-stroke has one intake event and two exhaust events in this order: normal intake event during the intake stroke, extra exhaust event during the compression stroke, no intake during the power stroke, however, a recirculation event occurs during the power stroke, and exhaust during the exhaust stroke. The 1.5-stroke braking mode involves a compression release during the compression stroke, and includes intaking recirculated exhaust gas for a second compression release. That is, previously exhausted gases are recirculated from the exhaust manifold into the combustion cylinder. The use of recirculated exhaust gas reduces the volume of cold air flowing through the exhaust following the initial (e.g., first) compression release, and results in relatively warmer intake air being used for the second release event. As a result, the 1.5-stroke braking mode reduces temperature losses at the aftertreatment system compared to either of the four-stroke or the two-stroke braking modes.

Advantageously, a control system or controller may control the operation of the engine system to automatically or nearly automatically selectively enable a particular engine braking mode during an engine braking operation. The engine braking mode may be selected based on one or more of a temperature value regarding the exhaust aftertreatment system and/or a braking power demand value.

In some embodiments, a control system or controller may receive data regarding a temperature of the exhaust aftertreatment system and/or a component thereof from one or more sensors (e.g., actual sensors and/or virtual sensors). For example, the data may include a temperature of a SCR catalyst. In some embodiments, the control system may compare the received temperature value to one or more thresholds. The control system may determine, based on the comparison, an engine braking mode to enable.

In an example embodiment, during a braking event, fuel is not provided to the engine such that combustion does not occur within the engine. The lack of combustion causes air flowing to the exhaust aftertreatment system to decrease in temperature thereby causing the exhaust aftertreatment system and/or components thereof to decrease in temperature. It may be desirable to select an engine braking mode to mitigate heat loss in the aftertreatment system during a braking event. For example, it may be desirable to operate one or more components of the aftertreatment system, such as the SCR catalyst or a particulate filter (such as a diesel particulate filter) above a minimum temperature threshold (e.g., to improve a performance characteristic of the component). Each engine braking mode may correspond with a predicted or estimated change in temperature of the aftertreatment system. For example, the control system may predict a change in temperature of a component(s) based on a current temperature of the component(s) and modeling or looking-up a future or estimated temperature of the component(s) based on an engine braking mode. In some embodiments, the predicted change in temperature is a future temperature value of a component of the aftertreatment system.

In an example scenario, an engine system includes an engine, an aftertreatment system fluidly coupled to the engine, and a control system communicably coupled to the engine. The control system may receive an engine braking request. Responsive to receiving the engine braking request, the control system enables an engine braking operation whereby at least one engine braking mode of a plurality of engine braking modes is enabled. The control system receives a braking power demand value regarding a braking power for the engine braking operation. The control system identifies one or more engine braking modes of the plurality of engine braking modes that satisfy the braking power demand value. The control system receives a temperature value regarding a temperature of the aftertreatment system. The control system compares the temperature value to at least one threshold, such as a first threshold or a second threshold. The control system selects and implements one of the one or more engine braking modes based on comparing the temperature value to the first threshold or the second threshold. Advantageously, the control system may select an engine braking mode of operation (e.g., the first engine braking mode, the second engine braking mode, and/or the third engine braking mode) to achieve a desired engine braking power and to mitigate (e.g., reduce) the impact of engine braking on aftertreatment system temperatures.

Each of the first, second, and third engine braking modes may differ from each other in some embodiments. For example, a timing of when an intake valve and/or an exhaust valve is/are actuated relative to an engine cycle (e.g., a four-stroke engine cycle) is different in each of the first, second, and third engine braking modes. In the embodiments described herein, the engine is configured as a four-stroke cycle engine. Generally, the four-stroke cycle may coincide with a single camshaft rotation. Thus, the engine braking modes described herein are described relative to the intake, compression, power, and exhaust strokes of a four-stroke cycle. For example, the intake valve and/or the exhaust valve may be selectively opened or closed during the four-stroke cycle. Compressed gases trapped in the cylinder are released (referred to herein as a "compression release event"), and a crankshaft of the engine applies work on the piston of the cylinder to drive the piston along the power stroke, due to the loss of compressed gases in the cylinder. In this way, some of the energy stored by the crankshaft is applied to the engine and functions to slow the engine down. In some embodiments, the release of compressed gas may reduce the temperature value regarding the temperature of the aftertreatment system.

The first engine braking mode, as described herein, may be a two-stroke engine braking mode. In the two-stroke braking mode, an exhaust valve of a cylinder is opened after the compression stroke begins and before the power stroke begins and closed after the power stroke begins. An intake valve is opened at or after the beginning of the power stroke to allow air to enter the cylinder. The exhaust valve is re-opened after the exhaust stroke begins and before a subsequent intake stroke begins. In this way, two compression release events occur per cam shaft rotation. In the two-stroke braking mode, the release of compressed gas may reduce the temperature of the aftertreatment system by a first amount.

In some embodiments, when operating in the two-stroke braking mode, the engine is capable of applying braking power up to a first braking power value. That is, the two-stroke braking mode corresponds to a first braking power value.

The second engine braking mode is a four-stroke braking mode. In the four-stroke braking mode, an exhaust valve of a cylinder is opened after the compression stroke begins and before the power stroke begins. In this way, one compression release events occur per cam shaft rotation. In the four-stroke braking mode, the release of compressed gas may reduce the temperature value regarding the temperature of the aftertreatment system by a second amount, less than the first amount.

In some embodiments, when operating in the four-stroke braking mode, the engine is capable of applying braking power up to a second braking power value, less than the first braking power value. That is, the four-stroke braking mode corresponds to a second braking power value. In some embodiments, the second braking power value may be dependent on a speed of the vehicle.

The third engine braking mode is a 1.5-stroke braking mode. In the 1.5-stroke braking mode, an exhaust valve of a cylinder is opened after the compression stroke begins and before the power stroke begins. The exhaust valve may remain open, remain partially open, or close and subsequently open after the power stroke begins. An intake valve remains closed during the power stroke such that, during the power stroke, previously released gas is recirculated from the exhaust manifold into the cylinder, via the exhaust valve (referred to herein as "brake gas recirculation"). The exhaust valve may remain open, remain partially open, or close and subsequently open after the exhaust stroke begins and before a subsequent intake stroke begins. This way, two compression release events occur per cam shaft rotation. The brake gas recirculation mitigates (e.g., reduces) the impact of engine braking on aftertreatment temperatures. For example, in the 1.5-stroke braking mode, the first compression release event uses fresh air, and the second compression release event uses the brake gas recirculation gases. Thus, the brake gas recirculation reduces the amount of fresh air provided to the aftertreatment system compared to the two-stroke engine braking mode which uses fresh air for both compression release events. In the 1.5-stroke braking mode, the release of compressed gas may reduce the temperature value regarding the temperature of the aftertreatment system by a third amount, less than the first amount and less than the second amount.

In some embodiments, when operating in the 1.5-stroke braking mode, the engine is capable of applying braking power up to a third braking power value. That is, the 1.5-stroke braking mode corresponds to a third braking power value. The third braking power value may be less than the first braking power value. In some embodiments, the third braking power value may be dependent on a speed of the engine. In some embodiments, when the speed of the engine is below a speed threshold, the third braking power value is greater than the second braking power value. In some embodiments, when the speed of the engine is at or above the speed threshold, the third braking power value is less than the second braking power value.

Thus, the first engine braking mode (e.g., the two-stroke braking mode) may reduce the temperature of the aftertreatment system by a first amount. The second engine braking mode (e.g., the four-stroke braking mode) may reduce the temperature of the aftertreatment system by a second amount, less than the first amount. The third engine braking mode (e.g., the 1.5-stroke braking mode) may reduce the temperature of the aftertreatment system by a third amount, less than the first amount and less than the second amount.

The first engine braking mode (e.g., the two-stroke braking mode) may apply a first engine braking power value to the crankshaft. The second engine braking mode (e.g., the four-stroke braking mode) may apply a second engine braking power value to the crankshaft, less than the first amount. The third engine braking mode (e.g., the 1.5-stroke braking mode) may apply a third engine braking power value to the crankshaft, less than the first amount. As briefly described above, when a speed of the engine is below a speed threshold, the third braking power value is greater than the second braking power value, and when the speed of the engine is at or above the speed threshold, the third braking power value is less than the second braking power value.

Advantageously, the control system may select an engine braking mode of operation (e.g., the four-stroke braking mode, the two-stroke braking mode, and/or the 1.5-stroke braking mode) to mitigate (e.g., reduce) the impact of engine braking on aftertreatment system temperatures and to achieve a desired engine braking power value.

In some embodiments, the temperature value regarding a temperature of the aftertreatment system may include one or more of an exhaust gas temperature value, an oxidation catalyst temperature value, a selective catalytic reduction catalyst temperature value, and/or a particulate filter temperature value. In some embodiments, the temperature value regarding a temperature of the aftertreatment system may be a physically measured temperature (e.g., using one or more real sensors), an estimated temperature (e.g., using one or more virtual sensors), or a combination thereof. In some embodiments, the at least one threshold may be a predetermined threshold, a dynamic threshold (e.g., a threshold that is updated in real-time or near real-time based on one or more other parameters), and/or a predicted threshold. For example, the temperature threshold can consider future (lookahead) engine and/or vehicle operating conditions, such as upcoming traffic, road grade (uphill, flat, downhill), and/or weather conditions. These and other features and benefits are described more fully herein below.

Figure 3:
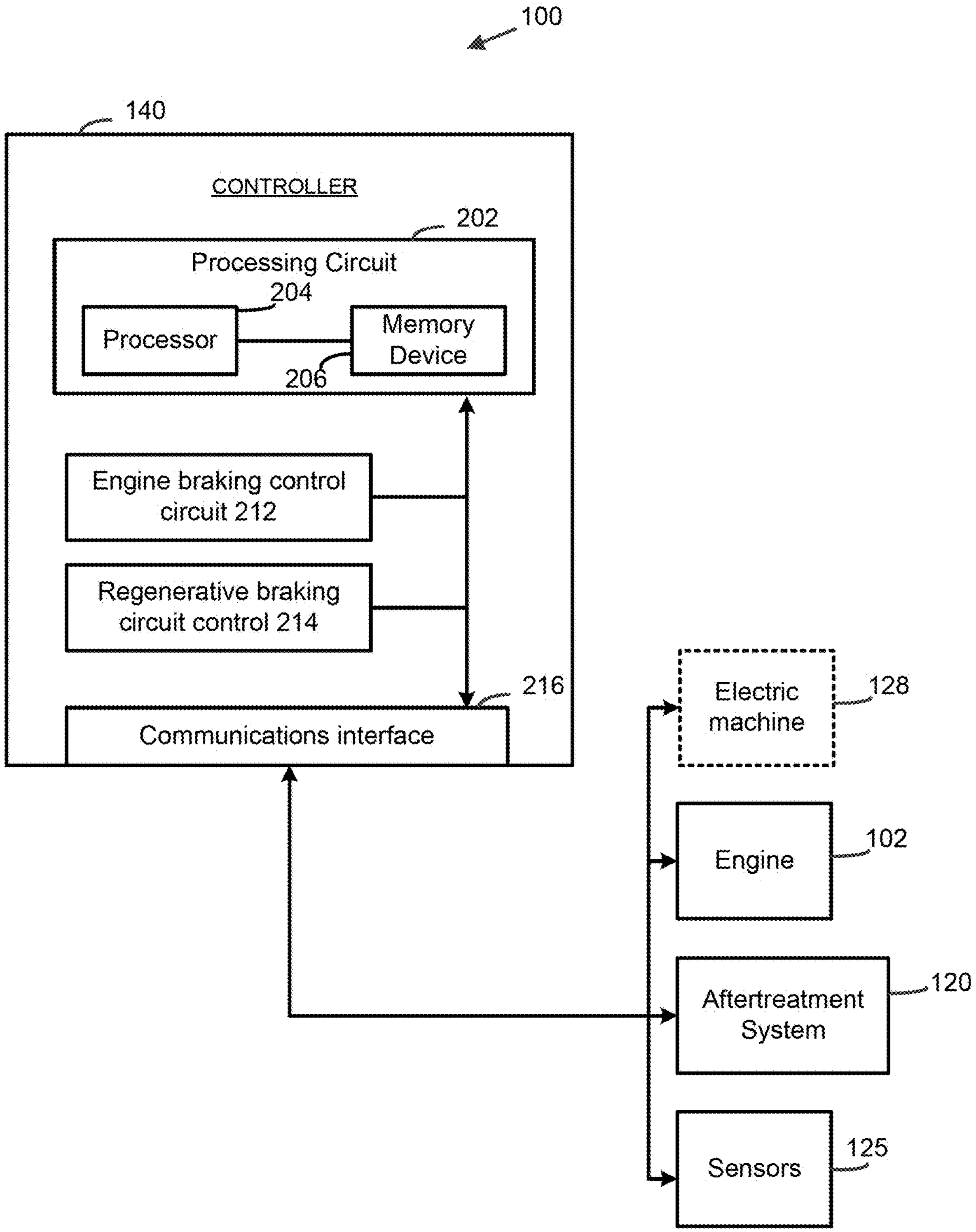
FIG. 3 is a block diagram of a controller of the system of FIG. 1, according to an example embodiment.

Referring now to FIG. 1, a schematic view of a block diagram of a system 100 (e.g., an engine system) is shown, according to an example embodiment. The system 100 includes an engine 102 and an aftertreatment system 120 in exhaust gas receiving communication with the engine 102. The system 100 includes a controller 140 (as shown in FIG. 3) and an operator input/output (I/O) device 130, where the controller 140 is communicably coupled to each of the aforementioned components.

In some embodiments, the system 100 includes a turbo device 122 disposed between the engine 102 and the aftertreatment system 120, such that the turbo device 122 is in exhaust gas receiving communication with the engine 102 and exhaust gas providing communication with the aftertreatment system 120. In these embodiments, the aftertreatment system 120 is in exhaust gas receiving communication with the engine 102 (e.g., via the turbo device 122). In other embodiments, the system 100 does not include the turbo device 122.

In the configuration of FIG. 1, the system 100 is included in a vehicle. The vehicle may be any type of on-road or off-road vehicle including, but not limited to, wheel-loaders, fork-lift trucks, line-haul trucks, mid-range trucks (e.g., pick-up truck, etc.), sedans, coupes, tanks, airplanes, boats, and any other type of vehicle. In other embodiments, the system 100 may be embodied in a stationary piece of equipment, such as a power generator or genset. All such variations are intended to fall within the scope of the present disclosure.

In the configuration shown in FIG. 1, the engine 102 is an internal combustion engine (ICE). The ICE may consume fuel, such as diesel, gasoline, hydrogen, natural gas, propane, etc., to generate power. In some embodiments, the engine 102 may be part of a hybrid system having a combination of an internal combustion engine and at least one electric machine coupled to at least one battery. For example, and with reference to the system shown in FIG. 1, the system 100 may include an electric machine 128 (e.g., a motor generator, an electric starter, etc.) that is coupled to the engine 102 via a shaft (e.g., an output shaft, a drive shaft, a crankshaft, etc.). The electric machine 128 is electrically coupled to a battery 132, such that the electric machine 128 is operable to receive power from the battery 132 and/or provide power to the battery 132. In some embodiments, the system 100 may be configured as a mild-hybrid powertrain, a parallel hybrid powertrain, a series hybrid powertrain, or a series-parallel powertrain.

Figure 2:
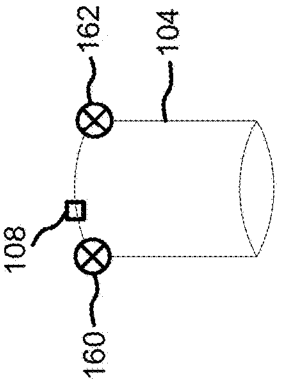
FIG. 2 is a block diagram of a cylinder assembly of the system of FIG. 1, according to an example embodiment.

The engine 102 includes one or more cylinders 104 (e.g., combustion cylinders). The cylinders 104 are disposed within a combustion chamber of the engine 102. In some embodiments, the engine 102 may be configured as a spark-ignition (SI) engine. In the example shown, the engine 102 is configured as a compression-ignition (CI) engine, and the cylinder 104 does not include an igniter. In some embodiments, and as shown in FIG. 2, each cylinder 104 has a corresponding fuel injector 108. In these embodiments, the fuel injectors 108 are configured to provide fuel to a corresponding cylinder 104. In other embodiments, the fuel injector(s) 108 may be positioned upstream of the cylinders 104 (e.g., at or within an intake manifold, such as the intake manifold 112, described herein). In these embodiments, the fuel injector(s) 108 are configured to provide fuel upstream of the cylinders 104 such that the cylinders 104 receive fuel from the fuel injector(s) 108.

In some embodiments, each cylinder 104 includes at least one intake valve 160 and at least one exhaust valve 162. The intake valve 160 is selectively positionable between an open position and a closed position. In the closed position, the intake valve 160 substantially prevents a gas stream from flowing into or out of the cylinder 104. In the open position and positions between the open position and the closed position, the intake valve 160 allows a gas stream (e.g., an intake gas stream, such as air or an air mixture, such as including EGR) to enter the cylinder 104. In some embodiments, the intake valve 160 allows the intake gas stream to flow into the cylinder 104 from the intake manifold 112. The exhaust valve 162 is selectively positionable between an open position and a closed position. In the closed position, the exhaust valve 162 substantially prevents a gas stream from flowing into or out of the cylinder 104. In the open position and in positions between the open position and the closed position, the exhaust valve 162 allows a gas stream (e.g., an exhaust gas stream) to exit the cylinder 104. In some embodiments, the exhaust valve 162 allows the exhaust gas stream to flow into the exhaust manifold 116, described herein.

The intake valve 160 and the exhaust valve 162 are each operable between an open position and a closed position. For example, the controller 140 may be configured to operate the intake valve 160 and the exhaust valve 162 (e.g., via an actuator, a solenoid valve, a camshaft, etc.). In this way, the controller 140 may selectively operate the intake valve 160 and/or the exhaust valve 162 between the open position and the closed position. As the intake valve and the exhaust valve 162 are actuated, an intake gas stream (e.g., air or an air-fuel mixture) flows into the cylinder 104 and an exhaust gas stream (e.g., air and/or exhaust gas including air, uncommuted fuel, and/or byproducts from combusting an air-fuel mixture, such as NOx, SOx, water, etc.) flows out of the cylinder 104. In this way, actuation of the intake valve 160 and/or the exhaust valve 162 of the engine 102 may facilitate the movement of a gas stream from the intake manifold 112 to the exhaust manifold 116.

In some embodiments, the intake valve 160 and/or the exhaust valve 162 may be actuated to achieve an engine braking mode of operation. In these embodiments, fuel is not provided to the cylinder 104. In embodiments where the engine 102 is an SI engine, the igniter does not ignite. Further, the intake valve 160 and the exhaust valve 162 are each actuated thereby causing a gas stream (e.g., air) to pass through the engine 102. In some embodiments, the intake valve 160 and/or the exhaust valve 162 may be actuated according to a predetermined engine braking mode. More specifically, a timing of when the intake valve 160 and/or the exhaust valve 162 is/are actuated relative to an engine cycle (e.g., a four-stroke engine cycle) is based on the predetermined engine braking mode. In some embodiments, the controller 140 may select an engine braking mode and cause the intake valve 160 and/or the exhaust valve 162 to actuate according to the engine braking mode. In the embodiments described herein, the engine 102 is configured as a four-stroke cycle engine. Thus, the engine braking modes described herein are described relative to the intake, compression, power, and exhaust strokes of a four-stroke cycle. In some embodiments, a first engine braking mode includes a two-stroke engine braking mode. In some embodiments, a second engine braking mode includes a four-stroke engine braking mode. In some embodiments, a third engine braking mode includes a 1.5 stroke engine braking mode.

Referring to FIG. 1, the engine 102 includes six cylinders 104. However, it should be understood that the engine 102 may include more or fewer cylinder 104 (e.g., at least one) than as shown in FIG. 1. Furthermore, the cylinders 104 may be provided in varying arrangements (e.g., in-line, horizontal, V, or other suitable cylinder arrangement).

The system 100 includes an intake conduit 110 and an intake manifold 112. The intake conduit 110 is configured to route an intake gas stream, including air (e.g., ambient air, compressed air, etc.), to the intake manifold 112. The intake manifold 112 is configured to route the intake gas stream from an intake conduit 110 into the engine 102. More specifically, the intake manifold 112 is configured to route air from the intake conduit 110 to each of the cylinders 104.

The system 100 may include an intake air throttle (IAT) valve 114. The IAT valve 114 is disposed at the intake conduit 110 and upstream of the intake manifold 112. The IAT valve 114 is structured to control an amount of air supplied to the engine 102. The IAT valve 114 may be actuated (e.g., by an actuator controlled by the controller 140) between an open position and a closed position. In the open position, the IAT valve 114 allows a maximum amount of air to flow from the air intake to the engine 102. In the closed position, the IAT valve 114 allows a minimum amount of air to flow from the air intake to the engine 102. The controller 140 may selectively actuate the IAT valve 114 (e.g., by controlling the actuator) in a plurality of positions between and/or including the open position and the closed position to adjust the amount of air received by the engine 102.

The system 100 includes an exhaust manifold 116 and an exhaust conduit 118. The exhaust manifold 116 is configured to route an exhaust gas stream from the engine to the exhaust conduit 118. More specifically, the exhaust manifold 116 is configured to route an exhaust gas stream from each of the cylinders 104 to the exhaust conduit 118. The exhaust conduit 118 is configured to route the exhaust gas stream from the exhaust manifold 116 to a downstream component, such as the aftertreatment system 120 and/or the turbo device 122. In some embodiments, a first portion of the exhaust conduit 118 is disposed between the exhaust manifold 116 and turbo device 122. The first portion of the exhaust conduit 118 is configured to route the exhaust gas stream from the exhaust manifold 116 to turbo device 122. In some embodiments, a second portion of the exhaust conduit 118 is disposed between the turbo device 122. The second portion of the exhaust conduit 118 is configured to route the exhaust gas stream from the turbo device 122 to the aftertreatment system 120.

The aftertreatment system 120 is in exhaust gas receiving communication with the engine 102. The aftertreatment system 120 includes components used to reduce exhaust emissions, such as a selective catalytic reduction (SCR) catalyst, a diesel oxidation catalyst (DOC), a diesel particulate filter (DPF), an exhaust fluid doser with a supply of exhaust fluid, a plurality of sensors for monitoring the aftertreatment system (e.g., a nitrogen oxide (NOx) sensor, temperature sensors, etc.), and/or still other components.

The turbo device 122 may be any type of turbo machinery, such as a turbocharger, a variable geometry turbocharger, a power turbine, etc. The turbo device 122 may be operatively coupled to the engine 102 and/or another component of the system 100, such as a drivetrain, a battery, an electric machine, or other suitable component. In some embodiments, the turbo device 122 is configured to compress a gas stream (e.g., an intake gas stream, an exhaust gas stream, etc.) and provide the compressed gas stream to the engine 102. For example, as shown in FIG. 1, the turbo device 122 may be coupled to the intake manifold 112 such that the turbo device is operative to provide the compressed gas stream to the engine 102 (e.g., via the intake manifold 112).

As shown, a plurality of sensors 125 are included in the system 100. The number, placement, and type of sensors included in the system 100 is shown for example purposes only. That is, in other configurations, the number, placement, and type of sensors may differ. The sensors 125 may be gas constituent sensors (e.g., $NO_x$ sensors, oxygen sensors, $H_2O$/humidity sensors, hydrogen sensors, etc.), temperature sensors, particulate matter (PM) sensors, flow rate sensors (e.g., mass flow rate sensors, volumetric flow rate sensors, etc.), other exhaust gas emissions constituent sensors, pressure sensors, some combination thereof, and so on. The temperature sensors may include an aftertreatment system component temperature sensor that is structured to acquire data indicative of a temperature of a component of the aftertreatment system 120, such as a catalyst member (e.g., a SCR catalyst member, a DOC catalyst member, etc.) a particular filter, or other component of the aftertreatment system 120. The data from the sensor may be used to determine an engine braking mode for an engine braking operation.

As shown in FIG. 1, the sensors 125 may be located at or proximate the aftertreatment system 120. For example, the system 100 may include sensors 125 located both before (e.g., upstream) and after (e.g., downstream) the aftertreatment system 120. In some embodiments, one or more sensors 125 may be located within the aftertreatment system 120. It should be understood that the location of the sensors may vary, and the system 100 may include more or fewer sensors than as shown in FIG. 1.

Additional sensors may be also included with the system 100. The sensors may include engine-related sensors (e.g., torque sensors, speed sensors, pressure sensors, flowrate sensors, temperature sensors, etc.). The sensors may further include sensors associated with other components of the system 100, such as the engine 102 and/or the turbo device 122. For example, the sensor may include speed sensor of the turbo device 122, a fuel quantity and injection rate sensor, fuel rail pressure sensor, etc.).

The sensors 125 may be real or virtual (i.e., a non-physical sensor that is structured as program logic in the controller 140 that makes various estimations or determinations). For example, an engine speed sensor may be a real or virtual sensor arranged to measure or otherwise acquire data, values, or information indicative of a speed of the engine 102 (typically expressed in revolutions-per-minute). The sensor is coupled to the engine (when structured as a real sensor) and is structured to send a signal to the controller 140 indicative of the speed of the engine 102. When structured as a virtual sensor, at least one input may be used by the controller 140 in an algorithm, model, lookup table, etc. to determine or estimate a parameter of the engine (e.g., power output, etc.). Any of the sensors 125 described herein may be real or virtual.

As utilized herein, the term "estimating" and like terms are used to refer to determining a current or past value that is not a measured value, such as measurements from a real sensor (e.g., a temperature measured by a temperature sensor). In other words, estimation refers to an approximation of a value(s) that may differ from an actual or measured value. Estimating a current or past value may be based on information from a real sensor (e.g., sensor data, historical sensor data, real-time sensor data, etc.) or information from another source. In some embodiments, estimating the current or past value can be performed using one or more models (e.g., statistical models, artificial intelligence models, machine learning models, etc.). For example, estimating a temperature value can include using data, such as sensor data, with a model to determine the temperature value. As utilized herein, the term "measuring" and like terms are used to refer to determining an approximate current or past parameter value based on detecting or receiving information regarding the parameter (e.g., using a sensor). The measured value may be close but not necessarily exactly the actual value of the measured current or past parameter value. As utilized herein, the term "determining" and like terms, in addition to the plain meaning of the word, are used to refer to estimating or measuring a value. As utilized herein, the term "predicting" and like terms are used to refer to determining or estimating a future value based on data (e.g., sensor data, historical sensor data, real-time sensor data, etc.). In some embodiments, determining the future value can be performed using one or more models (e.g., statistical models, artificial intelligence models, machine learning models, etc.) and/or other processes or mechanisms (e.g., a lookup table, etc.). For example, predicting a change in temperature of a component may include determining or estimating a current temperature (e.g., based on sensor data) and modeling or looking-up a future temperature of the component based on a change in engine operation, such as enabling an engine braking mode of operation.

The controller 140 is coupled, and particularly communicably coupled, to the sensors 125. Accordingly, the controller 140 is structured to receive data from one more of the sensors 125 and provide instructions/information to the one or more sensors 125. The received data may be used by the controller 140 to control one more components in the system 100 as described herein.

In some embodiments, the system 100 includes an electric machine 128. The electric machine 128 is configured to use electrical power (e.g., from the battery 132 or another power source such as an alternator) to output mechanical power. For example, the electric machine 128 may be coupled to a shaft (e.g., an output shaft, a drive shaft, a crankshaft, etc.) such that the shaft is operable to receive power output by the electric machine 128. In some embodiments, the electric machine 128 is coupled to the engine 102 (e.g., via the shaft). In some embodiments, the electric machine 128 is coupled to one or more wheels and/or axles of a vehicle system (e.g., via the shaft), such that the electric machine 128 is operable to provide and/or receive power to/from the wheels and/or axles. For example, the electric machine 128 may provide power to the wheels to propel the system 100. In another example, the electric machine 128 may receive power from the wheels (e.g., during a regenerative braking operation).

The operator input/output (I/O) 130 device may be coupled to the controller 140, such that information may be exchanged between the controller 140 and the I/O device, where the information may relate to one or more components of FIG. 1 or determinations (described below) of the controller 140. The operator I/O device enables an operator of the system 100 to communicate with the controller 140 and one or more components of the system 100 of FIG. 1. For example, the operator input/output device may include, but is not limited to, an interactive display, a touchscreen device, one or more buttons and switches, voice command receivers, etc. In this way, the operator input/output device may provide one or more indications or notifications to an operator, such as a malfunction indicator lamp (MIL), etc. Additionally, the system 100 may include a port that enables the controller 140 to connect or couple to a scan tool so that fault codes and other information regarding the system 100 may be obtained.

The controller 140 is structured to control, at least partly, the operation of the system 100 and associated sub-systems, such as the engine 102 and the operator I/O device 130. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 140 is communicably coupled to the systems and components of FIG. 1, the controller 140 is structured to receive data from one or more of the components shown in FIG. 1. The structure and function of the controller 140 is further described in regard to FIG. 3.

As the components of FIG. 1 are shown to be embodied in the system 100, the controller 140 may be structured as one or more electronic control units (ECUs), including or such as one or more microcontrollers. The controller 140 may be separate from or included with at least one of a transmission control unit, an exhaust aftertreatment control unit, a powertrain control module, an engine control unit, an engine control module, etc.

Now referring to FIG. 3, a schematic diagram of the controller 140 of the system 100 of FIG. 1 is shown, according to an example embodiment. As shown, the controller 140 includes at least one processing circuit 202 having at least one processor 204 and at least one memory device 206, an engine braking control circuit 212, a regenerative braking control circuit 214, and a communications interface 216. The controller 140 is structured to facilitate enabling an engine braking operation, select, and implement a particular engine braking mode of operation based on operation of the system. In some embodiments, the engine braking operation includes selecting an engine braking mode. In some embodiments, controller 140 is structured to facilitate enabling a regenerative braking operation. The engine braking operation and the regenerative braking operation may be implemented separately (e.g., one at a time), concurrently, or partially concurrently. Specific processes for enabling an engine braking mode of operation and/or a regenerative braking operation are described herein.

In one configuration, the engine braking control circuit 212 and/or the regenerative braking control circuit 214 are embodied as machine or computer-readable media storing instructions that are executable by a processor, such as processor 204. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media instructions may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the engine braking control circuit 212 and/or the regenerative braking control circuit 214 are embodied as hardware units, such as one or more electronic control units. As such, the engine braking control circuit 212 and/or the regenerative braking control circuit 214 may be embodied as one or more circuitry components including, but not limited to, processing circuitry, network interfaces, peripheral devices, input devices, output devices, sensors, etc. In some embodiments, the engine braking control circuit 212 and/or the regenerative braking control circuit 214 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the engine braking control circuit 212 and/or the regenerative braking control circuit 214 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on. The engine braking control circuit 212 and/or the regenerative braking control circuit 214 may also include or be programmable hardware devices such as field programmable gate arrays, programmable array logic, programmable logic devices or the like. The engine braking control circuit 212 and/or the regenerative braking control circuit 214 may include one or more memory devices for storing instructions that are executable by the processor(s) of the engine braking control circuit 212 and/or the regenerative braking control circuit 214. The one or more memory devices and processor(s) may have the same definition as provided below with respect to the memory device 206 and processor 204. In some hardware unit configurations, the engine braking control circuit 212 and/or the regenerative braking control circuit 214 may be geographically dispersed throughout separate locations in the system 100. Alternatively, and as shown, the engine braking control circuit 212 and/or the regenerative braking control circuit 214 may be embodied in or within a single unit/housing, which is shown as the controller 140.

In the example shown, the controller 140 includes the processing circuit 202 having the processor 204 and the memory device 206. The processing circuit 202 may be structured or configured to execute or implement the instructions, commands, and/or control processes described herein with respect to the engine braking control circuit 212 and/or the regenerative braking control circuit 214. The depicted configuration represents the engine braking control circuit 212 and/or the regenerative braking control circuit 214 as being embodied as machine or computer-readable media storing instructions. However, as mentioned above, this illustration is not meant to be limiting as the present disclosure contemplates other embodiments where the engine braking control circuit 212 and/or the regenerative braking control circuit 214, is configured as a hardware unit. All such combinations and variations are intended to fall within the scope of the present disclosure.

The processor 204 may be implemented as one or more single- or multi-chip processors, digital signal processors (DSPs), application specific integrated circuits (ASICs), field programmable gate arrays (FPGAs), and/or suitable processors (e.g., other programmable logic devices, discrete hardware components, etc. to perform the functions described herein). A processor may be a microprocessor, a group of processors, etc. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the engine braking control circuit 212 and/or the regenerative braking control circuit 214 may comprise or otherwise share the same processor which, in some example embodiments, may execute instructions stored, or otherwise accessed, via different areas of memory). In other embodiments, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 206 (e.g., memory, memory unit, storage device) may include one or more devices (e.g., RAM, ROM, Flash memory, hard disk storage) for storing data and/or computer code for completing or facilitating the various processes, layers and modules described in the present disclosure. For example, the memory device 206 may include dynamic random-access memory (DRAM). The memory device 206 may be communicably connected to the processor 204 to provide computer code or instructions to the processor 204 for executing at least some of the processes described herein. Moreover, the memory device 206 may be or include tangible, non-transient volatile memory or non-volatile memory. Accordingly, the memory device 206 may include database components, object code components, script components, or any other type of information structure for supporting the various activities and information structures described herein.

The communications interface 216 may include any combination of wired and/or wireless interfaces (e.g., jacks, antennas, transmitters, receivers, transceivers, wire terminals) for conducting data communications with various systems, devices, or networks structured to enable in-vehicle communications (e.g., between and among the components of the vehicle) and out-of-vehicle communications (e.g., with a remote server). For example, and regarding out-of-vehicle/system communications, the communications interface 216 may include an Ethernet card and port for sending and receiving data via an Ethernet-based communications network and/or a Wi-Fi transceiver for communicating via a wireless communications network. The communications interface 216 may be structured to communicate via local area networks or wide area networks (e.g., the Internet) and may use a variety of communications protocols (e.g., IP, LON, Bluetooth, ZigBee, radio, cellular, near field communication).

As shown in FIG. 3, the communications interface 216 may enable communication with the engine 102, the aftertreatment system 120 (and/or a component thereof), and/or the one or more sensors 125. In some embodiments, the communications interface 216 may enable communication with the electric machine 128.

The controller 140 is structured to enable operation of the engine 102. In some embodiments, the controller 140 is structured to enable "normal" operation of the engine 102. During normal operation of the engine 102, the controller 140 may control various aspects of the operation of the engine. For example, during operation, the controller 140 may receive one or more user inputs (e.g., via the operator I/O device 130) such as a user pressing an accelerator, a user pressing a brake, or other suitable user input. As another example, the controller 140 may control (e.g., increase, decrease, or maintain) an amount of air provided to the engine 102 by selectively controlling the IAT valve 114. As still another example, the controller 140 may control (e.g., increase, decrease, or maintain) an amount of fuel provided to the engine 102 by selectively operating the fuel injectors 108. As yet another example, the controller 140 may control the combustion of the air/fuel mixture in the cylinders 104. In some embodiments, during "normal" operation of the engine 102, the controller 140 does not enable an engine braking operation or a regenerative braking operation.

In some embodiments, the controller 140 is configured or structured to receive a braking request. In some embodiments, the braking request is received from a user (e.g., via the operator I/O device 130 or another suitable user input device). For example, the braking request may include a user depressing a brake pedal.

In some embodiments, the engine braking control circuit 212 is configured to enable an engine braking mode of operation responsive to receiving a braking request. Enabling the engine braking operation may include selecting an engine braking mode from a plurality of engine braking modes. As described herein, the engine braking modes may include a first engine braking mode (e.g., a two-stroke engine braking mode), a second engine braking (e.g., a four-stroke engine braking mode), and a third engine braking mode (e.g., a 1.5 stroke engine braking mode). In some embodiments, while operating in the engine braking mode of operation, the engine braking control circuit 212 is configured to switch engine braking modes. For example, the engine braking control circuit 212 may implement the first engine braking mode and subsequently implement the second engine braking mode.

Advantageously, the engine braking control circuit 212 is configured to select an engine braking mode for the engine braking operation to achieve a desired engine braking power while mitigating (e.g., reducing) the impact of engine braking on the aftertreatment system temperatures (i.e., reducing aftertreatment system temperatures).

In some embodiments, in addition to mitigating the impact of engine braking on aftertreatment system temperatures, selecting an engine braking mode may also mitigate the impact of engine braking on the temperature of another component of the engine system 100, such as a lubricant oil system or other suitable component of the engine system 100. In some embodiments, when the engine 102 is configured as a hydrogen-fueled internal combustion engine, the controller 140 may select an engine braking mode to mitigate the impact of engine braking on a temperature of a water condenser.

In some embodiments, the controller 140 receives data regarding a braking power demand value. The "braking power demand" value is an amount of power requested to be applied for slowing or decelerating the engine 102. The braking power demand value may be measured in horsepower, watts, or another suitable unit of power. In some embodiments, the braking power demand is based on a user input, such as a user depressing a brake pedal or another suitable user input. In some embodiments, the controller 140 may use one or more of a lookup table or a model (e.g., a mathematical model, a machine learning model, an artificial intelligence model, etc.) to determine the braking power demand value. As a specific example, the requested braking power demand value may be a function of an amount of depression of the brake pedal, such that further depression of the brake pedal corresponds with more requested braking power.

In some embodiments, the controller 140 determines braking power demand value based on data regarding a route of the system 100 (e.g., "route data"). For example, the route data may include upcoming or current traffic information, road grade (e.g., uphill, downhill, flat, etc.), road curvature (e.g., straight, curved, etc.), weather conditions (e.g., precipitation, wind, etc.), and/or other upcoming information regarding a route of the system 100. In some embodiments, the controller 140 is configured to receive the route data from a remote computing system (e.g., a computing system that is external to the system 100). For example, the controller 140 may receive the route data from a remote computing system (e.g., via the communications interface 216). In these embodiments, the controller 140 may determine the braking power demand value based on a lookup table or a model that correlates one or more pieces of the route data with the braking power demand value.

In some embodiments, the controller 140 determines braking power demand value based on data regarding the operation of the system 100 (e.g., "operational data"). As utilized herein, the term "operational data" and like terms are used to refer to data regarding the operation of a system, such as an engine system. In some embodiments, operational data may include settings, values, or other information regarding the operation of a system. The operational data may be measured (e.g., by one or more real sensors), estimated (e.g., by one or more virtual sensors or by a computer device or processing circuit), and/or otherwise determined.

As described above, operational data may include data regarding the operation of the system 100, such as the engine 102. In some embodiments, operational data may include settings, values, or other information regarding the operation of a system. In some embodiments, the operational data may be measured (e.g., by one or more real sensors) or determined or estimated (e.g., by one or more virtual sensors or by a computer device or processing circuit). In some embodiments, the operation data may be based on or include an input to the system, such as a user input (e.g., a target value, a demanded value, etc.). In some embodiments, the operational data and/or user input data includes an engine speed (in RPM), an engine torque, a vehicle speed, a vehicle load (e.g., in pounds or kilograms), a vehicle minimum braking power, a vehicle maximum braking power, etc. In these embodiments, the controller 140 may determine the barking power demand value based on a lookup table or a model that correlates the operational data and/or user input data with a braking power demand value.

In some embodiments, the engine braking control circuit 212 is configured to identify one or more engine braking modes of the plurality of engine braking modes that satisfy the braking power demand value. In some embodiments, the engine braking control circuit 212 is configured to compare the braking power demand value to one or more predetermined thresholds. For example, the engine braking control circuit 212 may compare the braking power demand value to a first braking power threshold and a second braking power threshold. In some embodiments, the first braking power threshold is greater than the second braking power threshold. In some embodiments, each of the one or more predetermined thresholds corresponds to a braking power value of one of the engine braking modes. In any of these embodiments, the engine braking control circuit 212 may determine that an engine braking mode (e.g., one or more of the first engine braking mode, the second engine braking mode, or the third engine braking mode) satisfies the braking power demand value based on comparing the braking power demand value to the one or more predetermined thresholds.

In some embodiments, the one or more predetermined thresholds may be dynamically determined based on one or more operational conditions of the engine 102. For example, the one or more predetermined thresholds may be based on a speed of the engine 102. In an example embodiment, because the braking power value of the second engine braking mode (e.g., the four-stroke engine braking mode) and the third engine braking mode (e.g., the 1.5-stroke engine braking mode) depend on the engine speed, one or both of the first braking power threshold or the second braking power threshold may correspond to a second braking power value of the second engine braking mode (e.g., the four-stroke engine braking mode) or a third braking power value of the third engine braking mode (e.g. the 1.5-stroke engine braking mode). In particular, the first braking power threshold may correspond to the greater of the second braking power value and the third braking power value and the second threshold may correspond to the lesser of the second braking power value and the third braking power value, based on the engine speed. That is, the first braking power threshold corresponds to one of the second braking power value or the third braking power value, and the second braking power threshold corresponds to the other of the second braking power value or the third braking power value. More specifically, the first braking power threshold corresponds to the greater of the second braking power value or the third braking power value, and the second braking power threshold corresponds to the lesser of the second braking power value or the third braking power value.

As described above, when the speed of the engine 102 is below a speed threshold, the third braking power value is greater than the second braking power value, and when the speed of the engine is at or above the speed threshold, the third braking power value is less than the second braking power value. Accordingly, when the engine speed value is at or above the speed threshold, the first braking power threshold corresponds to the second braking power value and the second braking power threshold corresponds to the third braking power value. In contrast, when the engine speed value is below the speed threshold, the first braking power threshold corresponds to the third braking power value and the second braking power threshold corresponds to the second braking power value.

In a first example operating scenario, when the braking power demand value is at or above the first threshold, the engine braking control circuit 212 may determine that the only the first engine braking mode (e.g., the two-stroke engine braking mode) satisfies the braking power demand value. Said another way, the first engine braking mode satisfies the braking power demand value responsive to the braking power demand value being at or above the first braking power threshold.

In a second example operating scenario, when (i) the braking power demand value is below the first threshold, (ii) the braking power demand value is at or above the second threshold, and (iii) the speed of the engine 102 is below a speed threshold, the engine braking control circuit 212 may determine that the first engine braking mode (e.g., the two-stroke engine braking mode) and/or the third engine braking mode (e.g., the 1.5-stroke engine braking mode) each satisfy the braking power demand value.

In a third example operating scenario, when (i) the braking power demand value is below the first threshold, (ii) the braking power demand value is at or above the second threshold, and (iii) the speed of the engine 102 is above the speed threshold, the engine braking control circuit 212 may determine that the first engine braking mode (e.g., the two-stroke engine braking mode) and/or the second engine braking mode (e.g., the four-stroke engine braking mode) each satisfy the braking power demand value.

In a fourth example operating scenario, when (i) the braking power demand value is below the first threshold and (ii) the braking power demand value is below the second threshold, irrespective of the engine speed, the engine braking control circuit 212 may determine that the first engine braking mode (e.g., the two-stroke engine braking mode), the second engine braking mode (e.g., the four-stroke engine braking mode), and/or the third engine braking mode (e.g., the 1.5-stroke engine braking mode) each satisfy the braking power demand value.

In other embodiments, engine braking control circuit 212 is configured to use one or more look-up tables and/or one or more models that correlate the braking power demand value to one or more engine baking mode of the plurality of engine braking modes.

In some embodiments, the controller 140 receives data regarding a temperature of the aftertreatment system 120. For example, the controller 140 may receive a temperature of an SCR catalyst member. In some embodiments, the controller 140 receives the data regarding a temperature of the aftertreatment system 120 from one or more sensors 125. In some embodiments, the data regarding a temperature of the aftertreatment system 120 includes a temperature value. In some embodiments, the data regarding a temperature of the aftertreatment system 120 is received from a real sensor 125. In these embodiments, the temperature of the aftertreatment system 120 is measured. In other embodiments, the data regarding a temperature of the aftertreatment system 120 is received from virtual sensors 125. In these embodiments, the temperature of the aftertreatment system 120 is estimated and/or predicted. In some embodiments, the predicted temperature of the aftertreatment system 120 is based on one or more future (lookahead) engine and/or vehicle operating conditions, such as upcoming road conditions (e.g., traffic construction, etc.), road grade (uphill, flat, downhill), and/or weather conditions (e.g., wind speed and direction, etc.).

In some embodiments, the engine braking control circuit 212 is configured to select an engine braking mode of the plurality of engine braking modes that satisfies a temperature threshold. In some embodiments, engine braking control circuit 212 is configured to select one of the engine braking modes that satisfies the braking power demand value, as described above. In some embodiments, the engine braking control circuit 212 is configured to compare the temperature value to one or more predetermined thresholds (e.g., one or more temperature thresholds). For example, the engine braking control circuit 212 may compare the temperature value to a first temperature threshold and a second temperature threshold. In some embodiments, the first temperature threshold is greater than the second temperature threshold. As described above, the temperature value may be a measured temperature value, an estimated temperature value, and/or a predicted temperature value.

In a first example operating scenario, when the temperature value is at or above the first threshold, the engine braking control circuit 212 may select and implement the first engine braking mode (e.g., the two-stroke engine braking mode). As described above, the first engine braking mode can satisfy any braking power demand value.

In a second example operating scenario, when (i) the temperature value is below the first threshold, (ii) the temperature value is at or above the second threshold, and (iii) the second engine braking mode (e.g., the four-stroke engine braking mode) can satisfy the braking power demand value, the engine braking control circuit 212 may select and implement the second engine braking mode.

In a third example operating scenario, when (i) the temperature value is below the first threshold, (ii) the temperature value is at or above the second threshold, and (iii) the second engine braking mode (e.g., the four-stroke engine braking mode) cannot satisfy the braking power demand value, the engine braking control circuit 212 may select and implement the first engine braking mode.

In a fourth example operating scenario, when (i) the temperature value is below the first threshold, (ii) the temperature value is below the second threshold, and (iii) the third engine braking mode (e.g., the 1.5-stroke engine braking mode) can satisfy the braking power demand value, the engine braking control circuit 212 may select and implement the third engine braking mode.

In a fifth example operating scenario, when (i) the temperature value is below the first threshold, (ii) the temperature value is below the second threshold, (iii) the third engine braking mode (e.g., the 1.5-stroke engine braking mode) cannot satisfy the braking power demand value, and (iv) the second engine braking mode (e.g., the four-stroke engine braking mode) can satisfy the braking power demand value, the engine braking control circuit 212 may select and implement the second engine braking mode.

In a sixth example operating scenario, when (i) the temperature value is below the first threshold, (ii) the temperature value is below the second threshold, (iii) the third engine braking mode (e.g., the 1.5-stroke engine braking mode) cannot satisfy the braking power demand value, and (iv) the second engine braking mode (e.g., the four-stroke engine braking mode) cannot satisfy the braking power demand value, the engine braking control circuit 212 may select and implement the first engine braking mode.

After enabling the determined or selected and implemented engine braking mode, the engine braking control circuit 212 may determine to maintain or continue the selected engine braking mode of operation. In some embodiments, the engine braking control circuit 212 may continue the engine braking mode of operation until the engine braking control circuit 212 receives an input or instructions to disable the engine braking mode of operation. In some embodiments, when the engine braking control circuit 212 determines to continue the engine braking mode of operation, the engine braking control circuit 212 may receive additional data regarding the temperature of the aftertreatment system 120 (e.g., a second temperature value), a speed of the engine 102 (e.g., a second engine speed value), and/or a power demand value (e.g., a second power demand value). The engine braking control circuit 212 may select an engine braking mode of operation based on the additional data, as described above. In this way, the engine braking control circuit 212 may iteratively select and implement the engine braking mode of operation based on receiving additional data regarding the temperature of the aftertreatment system 120. The subsequent engine braking mode of operation may be the same or different from the currently implemented engine braking mode of operation.

In any of the above-described embodiments, the controller 140 may be structured to adjust (e.g., increase or decrease) one or more thresholds for the engine braking operation. For example, the controller 140 may adjust the first temperature threshold, the second temperature threshold, the first braking power threshold, and/or the second braking power threshold. For example, the controller 140 may adjust one or more thresholds for the engine braking operation responsive to enabling the engine braking operation.

In some embodiments, the controller 140 may receive data regarding the one or more thresholds for the engine braking operation (referred to herein as "engine braking threshold data"). In some embodiments, the engine braking threshold data may be based on a user input. For example, a user may manually increase and/or decrease one or more of the first temperature threshold, the second temperature threshold, the first braking power threshold, and/or the second braking power threshold.

Advantageously, increasing one or more of the temperature thresholds may further mitigate (e.g., reduce) the reduction of aftertreatment system temperatures caused by engine braking. For example, by increasing one or more of the temperature thresholds, the controller 140 may select a different engine braking mode for the same aftertreatment system temperature, thereby mitigating the reduction of the aftertreatment system temperatures. That is, the controller 140 may select a new engine braking mode, and the new engine braking mode may have a smaller cooling effect on the aftertreatment system 120 (e.g., compared to a current or previous engine braking mode). For example, if the current or previous engine braking mode is the 2-stroke engine braking mode, the controller 140 may select and implement either the 1.5-stroke engine braking mode or the 4-stroke engine braking mode to mitigate heat loss. In another example, if the current or previous engine braking mode is the 4-stroke engine braking mode, the controller 140 may select and implement the 1.5-stroke engine braking mode to mitigate heat loss.

Similarly, decreasing one or more of the temperature thresholds may allow for greater engine braking power. For example, by decreasing one or more of the temperature thresholds, the controller 140 may select a lower stroke engine braking mode for the same aftertreatment system temperature, thereby allowing for greater braking power. That is, the controller 140 may select a lower stroke engine braking mode, and the lower stroke engine braking mode may allow for greater braking power.

Advantageously, decreasing one or more of the braking power thresholds may further mitigate (e.g., reduce) the reduction of aftertreatment system temperatures caused by engine braking. For example, by decreasing one or more of the braking power thresholds, the controller 140 may select a different engine braking mode for the same braking power demand, thereby mitigating the reduction of the aftertreatment system temperatures. That is, the controller 140 may select a different engine braking mode, and the different engine braking mode may have a smaller cooling effect on the aftertreatment system 120 (e.g., compared to a lower stroke engine braking mode). For example, if the current or previous engine braking mode is the 2-stroke engine braking mode, the controller 140 may select and implement either the 1.5-stroke engine braking mode or the 4-stroke engine braking mode to mitigate heat loss. In another example, if the current or previous engine braking mode is the 4-stroke engine braking mode, the controller 140 may select and implement the 1.5-stroke engine braking mode to mitigate heat loss.

Similarly, increasing one or more of the braking power thresholds may allow for greater engine braking power. For example, by increasing one or more of the braking power thresholds, the controller 140 may select a lower stroke engine braking mode for the same braking power demand, thereby allowing for greater braking power. That is, the controller 140 may select a lower stroke engine braking mode, and the lower stroke engine braking mode may allow for greater braking power.

In other embodiments, the engine braking threshold data may include route data and/or operational data. In these embodiments, the controller 140 may use one or more of a lookup table or a model to determine an adjustment for one or more of the engine braking thresholds. For example, when a route of the vehicle is uphill, the engine 102 will output more power thereby increasing the temperature of the aftertreatment system 120, and less engine braking power is needed to reduce the speed of the vehicle. Thus, the controller 140 may decrease one or more of the braking power thresholds and/or increase one or more of the temperature thresholds to mitigate the reduction of the aftertreatment system temperatures. In another example, when a route of the vehicle is downhill, the engine 102 will output less power thereby decreasing the temperature of the aftertreatment system 120, and more engine braking power is needed to reduce the speed of the vehicle. Thus, the controller 140 may increase one or more of the braking power thresholds and/or decrease one or more of the temperature thresholds to allow for greater braking power. In yet another example, when a route of the vehicle has heavy traffic and/or during cold ambient weather conditions, the temperature of the aftertreatment system 120 may be reduced. The controller 140 may decrease one or more of the braking power thresholds and/or increase one or more of the temperature thresholds to mitigate the reduction of the aftertreatment system temperatures. In still another example, when a route of the vehicle is at or above a predetermined altitude, the engine 102 ambient temperatures may be colder and/or ambient air may have a lower oxygen content than at lower altitudes. Thus, the controller 140 may decrease one or more of the temperature thresholds to allow for greater braking power and lower impact on aftertreatment system temperatures.

The regenerative braking control circuit 214 is configured to enable a regenerative braking operation. In some embodiments, the regenerative braking control circuit 214 may enable a regenerative braking operation concurrently, partially concurrently, or sequentially (e.g., before or after) an engine braking operation. In other embodiments, the regenerative braking control circuit 214 may enable a regenerative braking operation independently from an engine braking operation. The regenerative braking operation may include causing the electric machine 128 to convert the kinetic energy of the system 100 into electrical energy, which is then stored by the battery 132 for later use. In this way the regenerative braking operation may slow or decelerate the system 100. More specifically, the electric machine 128 is rotated by an output shaft (e.g., crankshaft) of the engine 102, such that the electric machine 128 captures energy from the output shaft. The electric machine 128 may convert the captured energy into electrical energy and route the electrical energy to the battery 132 for future use. For example, the electric machine 128 may use the energy stored in the battery 132 to propel the vehicle.

In some embodiments, while the engine 102 is operating in a normal engine operating condition, the regenerative braking control circuit 214 may receive a braking request, as described herein. Responsive to receiving the braking request, the regenerative braking control circuit 214 may receive data regarding the battery 132, such as a state of charge (SOC). The regenerative braking control circuit 214 may compare the SOC to a SOC threshold. Responsive to determining that the SOC is at or below the SOC threshold (which may indicate a low amount of power for various operations of the electric machine 128 of the system 100), the regenerative braking control circuit 214 may enable a regenerative braking operation. In some embodiments, in addition to enabling the regenerative braking operation responsive to determining that the SOC is at or below the SOC threshold, the regenerative braking control circuit 214 may also cause the engine braking control circuit 212 to enable an engine braking operation (e.g., when the regenerative braking operation alone would not be able to meet the braking power demand). Responsive to determining that the SOC is above the threshold, the regenerative braking control circuit 214 may cause the engine braking control circuit 212 to enable an engine braking operation (e.g., without the regenerative braking operation).

Figure 4:
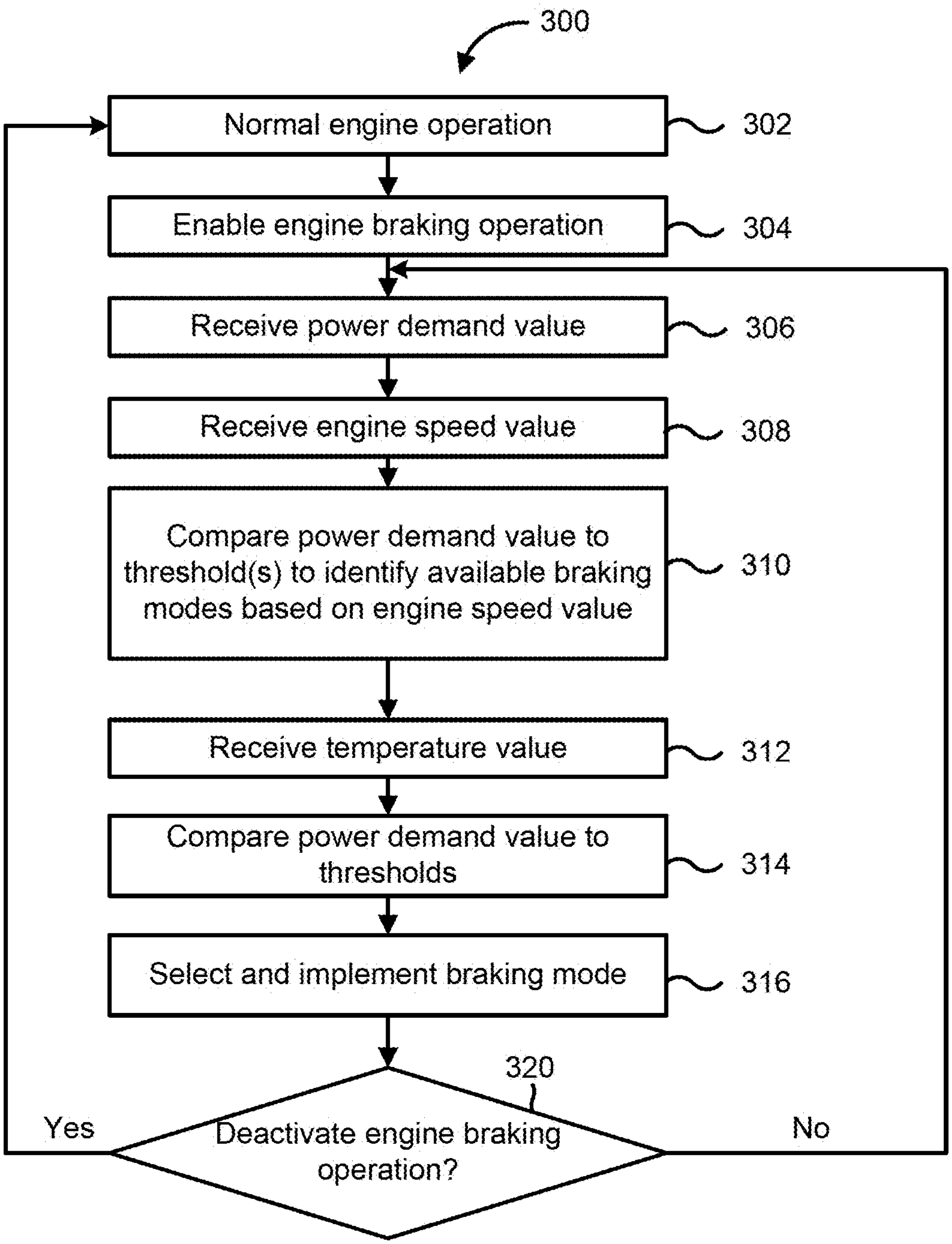
FIG. 4 is a flow diagram of a method of enabling an engine braking operation, according to an example embodiment.

Based on the foregoing and now referring to FIG. 4, a flow diagram of a method 300 of enabling an engine braking operation is shown, according to an example embodiment. In particular, the controller 140 is structured to enable an engine braking operation based on a temperature value of the aftertreatment system 120. It should be understood that the order of the method 300 is shown as an example only. That is, one or more processes may be performed concurrently, partially concurrently, sequentially, and/or in a different order than as shown in FIG. 4. Further, some processes of the method 300 may be omitted while other processes may be added to the method 300. The method 300 may be performed periodically and/or dynamically responsive to changes in, for example, information received from the sensors 125.

At process 302, the controller 140 enables normal operation of the engine 102. At process 304, the controller 140 enables an engine braking operation. As described above, the controller 140 may enable the engine braking operation responsive to receiving a braking request (e.g., depression of a brake pedal, a user input on the I/O device to initiate engine braking, etc.). In other embodiments, the controller 140 may enable the engine braking operation based on a trigger condition. The trigger condition may relate to an operational status of the aftertreatment system 120. For example, the trigger condition may include one or more of a regeneration event, a deSOx event, or a deposit mitigation event. In some embodiments, trigger condition may include a system out NOx value. The system out NOx value is an amount of NOx output by the system 100 (e.g., output at an outlet of the aftertreatment system 120. The system out NOx value may be measured (e.g., by one or more actual sensors 125) and/or estimated based on other sensor data, such as an engine out NOx, a dosing fluid value, an aftertreatment system temperature value, and/or one or more other operational parameters of the aftertreatment system 120.

At process 306, the controller 140 receives data regarding a braking power demand. In some embodiments, the data regarding the braking power demand may include a braking power demand value (which may be an instantaneous value, an average value over a predefined operating period (e.g., distance and/or time), and/or a series of values (e.g., a time-based series of value)). In other embodiments, the controller 140 may determine the braking power demand value based on the data regarding the braking power demand, as described above. Additionally, as described above, the braking power demand may be based on an expected duration (e.g., distance and/or time) that the engine brakes are expected to be active (e.g., an "engine braking duration").

In some embodiments, the controller 140 may determine the engine braking duration based on at least one of a look-up table and/or a model that correlates one or more pieces of the route data with an anticipated or expected engine braking duration (which may be based on various other data as well, such as an expected speed of the vehicle during the route or portion thereof, etc.). For example, experimental data based on operating in similar circumstances may be translated to a look-up table and/or used to train a model that correlates one or more pieces of the route data with the engine braking duration (i.e., where the engine braking duration is tracked and estimated for these various operating scenarios and/or circumstances). In another example, simulation data for various operating circumstances may be translated to a look-up table and/or used to train a model that correlates one or more pieces of the route data with the engine braking duration. In these situations, the engine braking duration may be readily determined based on current and/or expected operating conditions of the vehicle.

At process 308, the controller 140 receives data regarding a speed of the engine 102 (e.g., an engine speed value). As described herein the engine speed value may be a measured or sensed by one or more sensors 125 or estimated based on one or more operational parameters of the engine 102.

At process 310, the controller 140 compares the braking power demand value to one or more predetermined thresholds. As described above, one or more of the thresholds may be dynamic thresholds that change based on the engine speed value. Based on comparing the braking power demand value to the one or more thresholds, the controller 140 may identify "available" braking modes. The "available" braking modes may include one or more engine braking modes that satisfy the braking power demand value.

At process 312, the controller 140 may receive information regarding a temperature of the aftertreatment system 120 (e.g., a temperature value). The aftertreatment system temperature may be one or more of an exhaust gas temperature at a particular location, an oxidation catalyst temperature, a catalyst temperature (e.g., a SCR catalyst temperature), a particulate filter temperature (e.g., a DPF temperature value), or some other temperature regarding the aftertreatment system. As described above, the temperature value may be a measured temperature value, an estimated temperature value, or a predicted temperature value.

The temperature may be an instantaneous value, an average value over a predefined operation of the system (e.g., in distance, time, etc.), or some other representative value. Thus, the temperature value may be an individual value or a series of values (e.g., a time-series of values).

In some embodiments, the temperature value is a predicted temperature value or a predicted change in temperature value. Each engine braking mode may correspond with a predicted temperature value or a predicted change in temperature value of the aftertreatment system 120 (or a component thereof). By way of example, the controller 140 may use at least one of a look-up table and/or a model that correlates the engine braking mode to at least one of a future temperature value and/or a predicted change in temperature. In some embodiments, one or both of the future temperature value and/or the predicted change in temperature is based on a current temperature value regarding the aftertreatment system 120 (e.g., a current, measured temperature value regarding the aftertreatment system 120).

In some embodiments, the future temperature value is the predicted temperature value. In other embodiments, the predicted change in temperature is the predicted temperature value. In still other embodiments, the controller 140 uses the current temperature value regarding the aftertreatment system 120 and the predicted change in temperature to determine the predicted temperature value (e.g., the predicted temperature value is the summation of the current temperature value and the predicted change in temperature). In any of these embodiments, the controller 140 may receive the predicted temperature value or predicted change in temperature value for each engine braking mode from a model or lookup table. For example, one or more simulations and/or experimental data may be used to estimate temperature values for certain architectures (e.g., engine and aftertreatment system architectures) under various operating conditions.

In some embodiments, the temperature value is a predicted temperature value during a shift event. That is, the predicted temperature value is based on predicted change in temperature of a component of the aftertreatment system due to a "shift event." The "shift event" refers to a change in a gear or setting of a transmission of the system 100. The shift event may include "upshifting" (e.g., increasing a gear or increasing the gear ratio of the transmission) or "downshifting" (e.g., decreasing a gear or decreasing a gear ratio of the transmission). Upshifting may correspond to an increase in engine power output, which, in turn, may lead to relatively higher temperatures. Downshifting may correspond to a decrease in power output, which, in turn, may lead to relatively lower temperatures. In some embodiments, the controller 140 may receive an indication of a current or upcoming shift event based on, for example, receiving a user input, such as a change in position of a shift stick, a button press, a paddle shift press, etc. In other embodiments, the controller 140 may receive an indication of or determine a current or upcoming shift event based on the route data indicating an upcoming change in road grade or other road conditions. For example, the controller 140 may determine that an upcoming shift event is a downshift (e.g., from a third gear to a second gear, from a second gear to a first gear, etc.) based on the route data indicating an increase in road grade. In another example, the controller 140 may determine that an upcoming shift event is an upshift (e.g., from a second gear to a third gear, from a first gear to a second gear, etc.) based on the route data indicating a decrease in road grade. In any of these embodiments, the shift event (e.g., upshift or downshift) can include a gear change between any available gear of the transmission (e.g., between a first gear and a second gear, between the second gear and a third gear, between the first gear and the third gear, etc.).

Each shift event (e.g., upshift or downshift) may correspond with a predicted temperature value or predicted change in temperature value of the aftertreatment system 120. In some embodiments, one or both of the predicted temperature value or the predicted change in temperature value of the aftertreatment system 120 is also based on a current temperature value regarding the aftertreatment system 120 (e.g., a current, measured temperature value regarding the aftertreatment system 120). In some embodiments, experimental data based on operating in similar circumstances may be translated to a look-up table and/or used to train a model that correlates each shift event with the predicted temperature value or the predicted change in temperature value of the aftertreatment system 120. In another example, simulation data for various operating circumstances may be translated to a look-up table and/or used to train a model that correlates each shift event with the predicted temperature value or the predicted change in temperature value of the aftertreatment system 120.

In some embodiments, the future temperature value is the predicted temperature value during the shift event. In other embodiments, the predicted change in temperature is the predicted temperature value during the shift event. In still other embodiments, the controller 140 uses the current temperature value regarding the aftertreatment system 120 and the predicted change in temperature to determine the predicted temperature value during the shift event (e.g., the predicted temperature value is the summation of the current temperature value and the predicted change in temperature). In any of these embodiments, the controller 140 may receive the predicted temperature value during the shift event for each for a current or upcoming shift event from a model or lookup table.

During or before a shift event, the controller 140 may receive or determine the predicted temperature value. By way of example, the controller 140 may receive an indication of a current or upcoming shift event (e.g., an upshift or a downshift) based on at least one of a user input or the route data. Responsive to receiving the indication of the current or upcoming shift event (e.g., via a user input and/or based on the route data), the controller 140 may use at least one of a look-up table and/or a model that correlates each shift event to at least one of a future temperature value and/or a predicted change in temperature.

In one example operating scenario, a first shift event is an upshift event (e.g., from a first gear to a second gear). The controller 140 may determine the predicted temperature value regarding the aftertreatment system due to the first shift event by, for example, receiving a first predicted temperature change value that corresponds to the first shift event (e.g., changing from the first gear to the second gear); receiving the current temperature value regarding the aftertreatment system 120; and determining the predicted temperature value (e.g., as the summation of the current temperature value and the first predicted temperature change value).

In another example operating scenario, a second shift event is a downshift event (e.g., from a second gear to a first gear). The controller 140 may determine the predicted temperature value regarding the aftertreatment system due to the second shift event by, for example, receiving a second predicted temperature change value that corresponds to the second shift event (e.g., changing from the second gear to the first gear); receiving the current temperature value regarding the aftertreatment system 120; and determining the predicted temperature value (e.g., as the summation of the current temperature value and the second predicted temperature change value).

At process 314, the controller 140 compares the temperature value to one or more thresholds, such as a first temperature threshold and a second temperature threshold. In an example embodiment, the first temperature threshold is greater than the second temperature threshold. At process 316, the controller 140 may select and implement an engine braking mode based on comparing the temperature value to the one or more thresholds. The controller 140 may select and implement an engine braking mode only if the selected engine braking mode is an "available" braking mode.

At process 320, the controller 140 determines whether to deactivate the engine braking operation. In some embodiments, the controller 140 determines to deactivate the engine braking operation based on a user input. For example, a user may provide a signal to the controller 140 (e.g., via one or more of a lever, a button, a pedal, etc.) that indicates that the engine braking operation should be deactivated, such a brake pedal being released. In some embodiments, the controller 140 determines to keep the engine braking operation enabled when the controller 140 does not receive the user input and/or receiving a user input indicating that the engine braking operation should remain enabled, such as the brake pedal remaining depressed.

In some embodiments, when the controller determines that the engine braking operation should remain enabled, the controller 140 may return to process 306. When the controller 140 returns to process 306, the controller may repeat process 306, process 308, process 310, process 312, process 314, and/or process 316. In this way, the controller 140 may select and implement subsequent engine braking mode. The subsequent engine braking mode may be the same engine braking mode that was previously selected and implemented. For example, responsive to the operating conditions of the system 100 (e.g., the power demand value, the engine speed value, the temperature value, etc.) remaining substantially the same, the controller 140 may select and implement the previously selected and implemented engine braking mode. The subsequent engine braking mode may be different than engine braking mode that was previously selected and implemented. For example, responsive to the operating conditions of the system 100 (e.g., the power demand value, the engine speed value, the temperature value, etc.) changing (e.g., increasing or decreasing), the controller 140 may select and implement a different engine braking mode. In this way, the controller 140 may initially select and implement a first engine braking mode and, in response to a change in the engine operating conditions, such as a change (e.g., increase or decrease) in the temperature value (or a change in the temperature value), the controller 140 may select and implement a second engine braking mode, different than the first engine braking mode. Advantageously, changing the engine braking mode while the engine braking operation is enabled can mitigate aftertreatment heat loss (e.g., by switching to an engine braking mode having a smaller cooling effect on the aftertreatment system 120). For example, if the current or previous engine braking mode is the 2-stroke engine braking mode, the controller 140 may select and implement either the 1.5-stroke engine braking mode or the 4-stroke engine braking mode to mitigate heat loss. In another example, if the current or previous engine braking mode is the 4-stroke engine braking mode, the controller 140 may select and implement the 1.5-stroke engine braking mode to mitigate heat loss.

Additionally and/or alternatively, the controller 140 may select and implement a different engine braking mode responsive to the engine brake duration being longer than a predetermined threshold and/or longer than expected. For example, responsive to the engine brake duration being longer than a predetermined threshold (or longer than expected), the controller 140 may select and implement a different engine braking mode. In this way, the controller 140 may initially select and implement a first engine braking mode and, in response to a change in the engine brake duration or a change in the expected engine brake duration, the controller 140 may select and implement a second engine braking mode, different than the first engine braking mode.

In an example operating scenario, when the engine brake duration is at or below a predetermined threshold, the originally selected engine braking mode may satisfy the braking power demand value while having minimal cooling effect on the aftertreatment system 120. Conversely, when the engine brake duration is above a predetermined threshold, the originally selected engine braking mode may satisfy the braking power demand value but have a greater-than-desired cooling effect on the aftertreatment system 120. For example, when the originally selected engine braking mode is the 2-stroke engine braking mode, the controller 140 may switch to one of the 1.5-stroke engine braking mode or the 4-stroke engine braking mode to mitigate aftertreatment heat loss (e.g., because the 1.5-stroke and the 4-stroke engine braking modes have a smaller cooling effect on the aftertreatment system 120 compared to the 2-stroke engine braking mode). Advantageously, changing the engine braking mode while the engine braking operation is enabled can mitigate aftertreatment heat loss (e.g., by switching to an engine braking mode having a smaller cooling effect on the aftertreatment system 120).

Still referring to FIG. 4, the controller 140 may select and implement an engine braking mode based on one or more operating conditions of the system 100 using the method 300. According to a first example embodiment, the controller 140 may select and implement an engine braking mode based on the power demand value (e.g., the power demand value received at process 306) and/or the temperature value (e.g., the temperature value received at process 312).

According to a second example embodiment, the controller 140 determines whether to deactivate the engine braking operation based on a location of the system 100 (e.g., a vehicle location). For example, the controller 140 may receive information regarding the vehicle location, such as a GPS location or other suitable location information. The controller 140 may compare the vehicle location to one or more predetermined location identifiers, such as a geo-fence. The controller 140 may determine whether to deactivate the engine braking operation based on the comparison. For example, within a predetermined geo-fence, engine braking may be prohibited (e.g., within a residential area) and the controller 140 may determine to deactivate the engine braking operation. Similarly, the controller 140 may determine to keep the engine braking operation enabled when outside of the predetermined geo-fence.

According to a third example embodiment, the controller 140 determines whether to deactivate the engine braking operation based on a current time of day. For example, engine braking may be prohibited during a first predetermined part of a day (e.g., nighttime, after 8 PM, etc.) and engine braking may be allowed during a second predetermined part of the day (e.g., daytime, after 6 AM, before 8 PM, etc.). The controller 140 may determine to deactivate the engine braking operation during the first predetermined part of the day. The controller 140 may determine to keep the engine braking operation enabled during the second predetermined part of the day.

According to a fourth example embodiment, the controller 140 may determines whether to deactivate the engine braking operation based on a regenerative braking capability of the system 100. For example, the controller 140 may receive a SOC of the battery 132. Responsive to determining that the SOC is at or below a predetermined threshold, the controller 140 may determine to deactivate the engine braking operation and enable a regenerative braking operation. In an example embodiment, the regenerative braking operation may increase the SOC above the predetermined threshold. Responsive to determining that the SOC is at or above a predetermined threshold, the controller 140 may determine to keep the engine braking operation enabled.

According to a fifth example embodiment, the controller 140 may select and implement an engine braking mode based on an anticipated/expected temperature change during a shift event. For example, the controller 140 may select and implement an engine braking mode based on at least the predicted temperature change value (e.g., the predicted temperature value received at process 312).

According to a sixth example embodiment, the controller 140 may select and implement an engine braking mode based on (i) a length of time/distance engine brakes are expected to be active (e.g., the "engine brake duration") and/or (ii) a change in temperature expected during upcoming braking event. The controller 140 may receive the braking power demand value that is based on, at least in part, the engine brake duration (e.g., at process 306). Additionally, the controller 140 may receive the predicted change in temperature value (e.g., at process 312). The controller may use the braking power demand value and the predicted change in temperature value to select and implement the engine braking mode.

It should be understood that the controller 140 may use any of the above-described embodiments individually or in any combination.

Responsive to determining to deactivate the engine braking operation, the controller 140 returns to process 302. Responsive to determining to keep the engine braking operation enabled, the controller 140 returns to process 306. When the method 300 returns to process 306 the controller 140 may optionally perform one or more of process 306, process 308, and/or process 312. In these embodiments, responsive to receiving at least one of a new power demand value (e.g., at process 306) or a new engine speed value (e.g., at process 308), the method 300 may continue to process 310. Additionally, responsive to receiving a new temperature value (e.g., at process 312), such as a measured temperature value, an estimated temperature value, and/or a predicted temperature value, the method 300 may continue to process 314. In this way, the controller 140 may switch between engine braking modes based on a new power demand value, a new engine speed value, and/or a new temperature value. In some embodiments, the controller 140 may switch between engine braking modes responsive to receiving the new power demand value, the new engine speed value, and/or the new temperature value.

Figure 5:
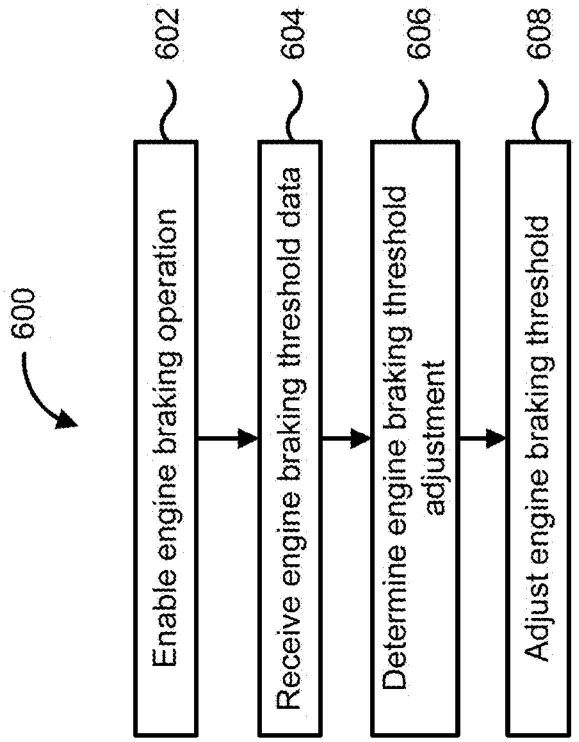
FIG. 5 is a flow diagram of another method of adjusting one or more thresholds for an engine braking operation, according to an example embodiment.

Now referring to FIG. 5, a flow diagram of a method 600 of adjusting one or more thresholds for an engine braking mode of operation is shown, according to an example embodiment. In particular, the controller 140 may adjust (e.g., increase, maintain, or decrease) one or more thresholds for the engine braking mode of operation, such as the first temperature threshold, the second temperature threshold, the first power threshold, and/or the second power threshold. It should be understood that the order of the method 600 is shown as an example only. That is, one or more processes may be performed concurrently, partially concurrently, sequentially, and/or in a different order than as shown in FIG. 5. Further, some processes of the method 600 may be omitted while other processes may be added to the method 600. The method 600 may be performed periodically and/or dynamically responsive to changes in, for example, information received from the sensors 125.

At process 602, the controller enables an engine braking operation. Process 602 may be substantially similar to or the same as process 304 of the method 300. At process 604, the controller 140 receives engine braking threshold data. As described above, the engine braking threshold data may include data regarding the operation of the engine 102 (e.g., engine operational data) and/or data regarding a route of the system 100 (e.g., route data).

At process 606, the controller 140 determines an engine braking mode of operation threshold adjustment. As described above, the controller 140 may use a lookup table and/or one or more models that correlate the engine braking threshold data with the engine braking threshold adjustment to determine the engine braking threshold adjustment. In some embodiments, the controller 140 may determine an engine braking mode of operation threshold adjustment based on receiving one or more trigger conditions. In some embodiments, the trigger condition may relate to a "state of health" (SOH) of one or more components of the aftertreatment system 120. The "state of health" of a component may include one or more indications of a performance of the component, an age of the component, a time since last service of the component, and/or other suitable indications of the health of the component. In an example embodiment, the controller 140 may compare the SOH of one or more components of the aftertreatment system to a predetermined threshold. Responsive to determining that the SOH is at or above the threshold, the controller 140 may increase one or more engine braking threshold values and/or reduce a difference between the engine braking threshold values. Responsive to determining that the SOH is below the threshold, the controller 140 may decrease or maintain one or more engine braking threshold values.

At process 608, the controller adjusts the engine braking threshold based on the determined engine braking threshold adjustment. In some embodiments, the controller 140 may repeat the method 600 for each of the engine braking thresholds.

In some embodiments, the controller 140 may increase one or more of the temperature thresholds to mitigate (e.g., reduce) the reduction of aftertreatment system temperatures caused by engine braking. For example, by increasing one or more of the temperature thresholds, the controller 140 may select a higher stroke engine braking mode for the same aftertreatment system temperature, thereby mitigating the reduction of the aftertreatment system temperatures.

In some embodiments, the controller 140 may decrease one or more of the temperature thresholds to allow for greater engine braking power. For example, by decreasing one or more of the temperature thresholds, the controller 140 may select a lower stroke engine braking mode for the same aftertreatment system temperature, thereby allowing for greater braking power.

In some embodiments, the controller 140 may decrease one or more of the braking power thresholds to mitigate (e.g., reduce) the reduction of aftertreatment system temperatures caused by engine braking. For example, by decreasing one or more of the braking power thresholds, the controller 140 may select a higher stroke engine braking mode for the same braking power demand, thereby mitigating the reduction of the aftertreatment system temperatures.

In some embodiments, the controller 140 may increase one or more of the braking power thresholds may allow for greater engine braking power. For example, by increasing one or more of the braking power thresholds, the controller 140 may select a lower stroke engine braking mode for the same braking power demand, thereby allowing for greater braking power.

Figure 6:
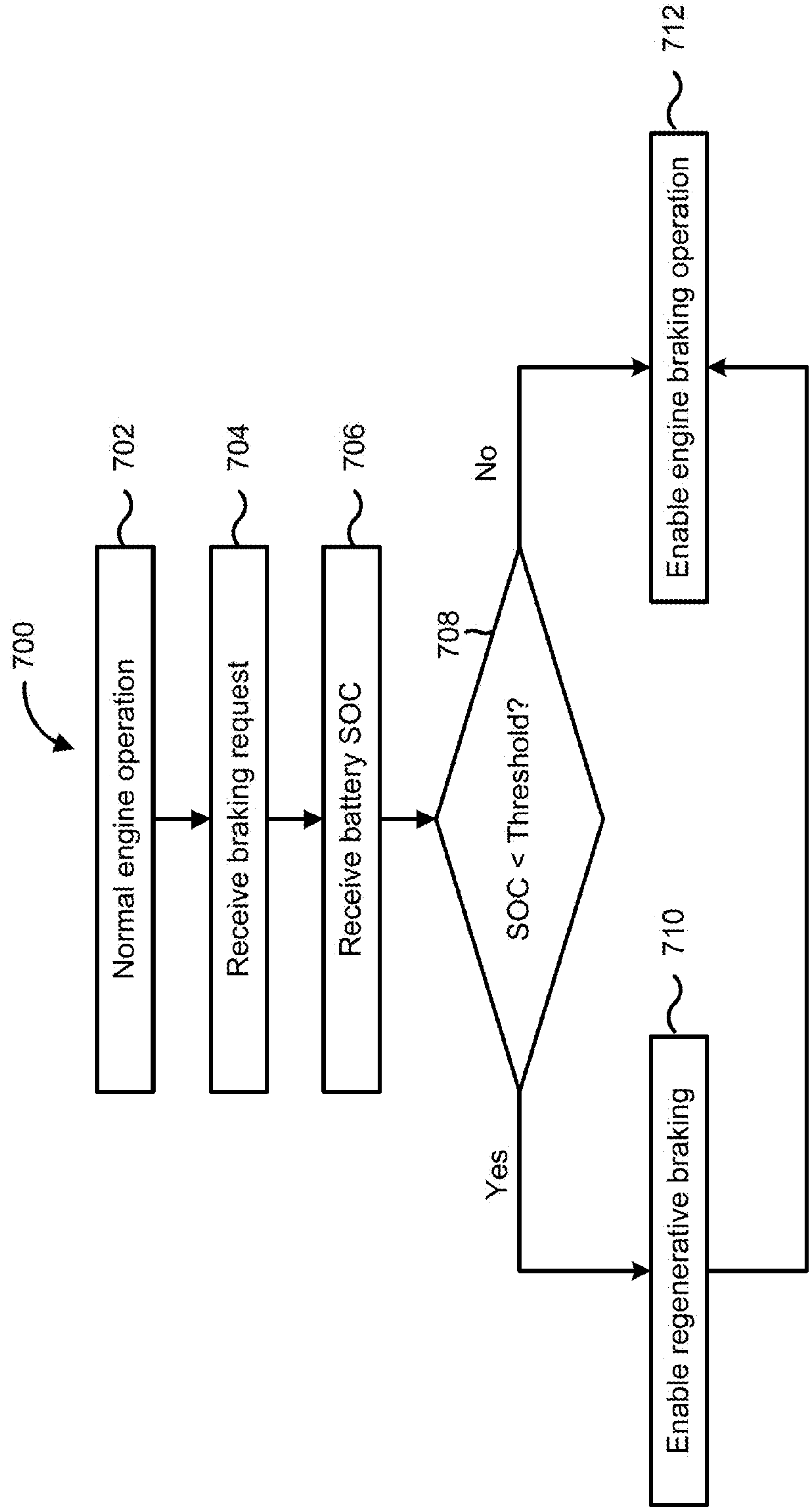
FIG. 6 is a flow diagram of a method of enabling an engine braking operation and/or a regenerative braking operation, according to another example embodiment.

Now referring to FIG. 6, a flow diagram of a method 700 of enabling an engine braking operation or a regenerative braking operation is shown, according to an example embodiment. In particular, the controller 140 is structured to enable one or both of the engine braking operation or the regenerative braking operation. It should be understood that the order of the method 700 is shown as an example only. That is, one or more processes may be performed concurrently, partially concurrently, sequentially, and/or in a different order than as shown in FIG. 6. Further, some processes of the method 700 may be omitted while other processes may be added to the method 700. The method 700 may be performed periodically and/or dynamically responsive to changes in, for example, information received from the sensors 125.

At process 702, the controller 140 enables normal engine operation of the engine 102. At process 704, the controller 140 receives a braking request. At process 706, the controller 140 receives a SOC value of the battery 132. In some embodiments, the controller 140 may receive the battery SOC value responsive to receiving the barking request. At process 708, the controller 140 compares the SOC value to a predetermined SOC threshold.

At process 710, responsive to determining that the SOC value is at or below the SOC threshold, the controller 140 enables a regenerative braking operation whereby the controller 140 causes the electric machine 128 to capture kinetic energy of the system 100 and generate electrical energy for storage by the battery 132. In some embodiments, the controller 140 enables the regenerative braking operation subsequent to receiving the braking request (e.g., at process 704). In some embodiments, the controller 140 may continue to process 712 concurrently, partially concurrently, or sequentially (e.g., before and/or after) with process 710.

At process 712, responsive to determining that the SOC value is above the SOC threshold, the controller 140 enables the engine braking operation. In some embodiments, the controller 140 performs the process 712 concurrently, partially concurrently, or sequentially (e.g., before and/or after) with process 710. In some embodiments, process 712 is substantially similar to or the same as process 304 of the method 300. That is the controller 140 may continue with the method 300 after process 712.

Figure 7:
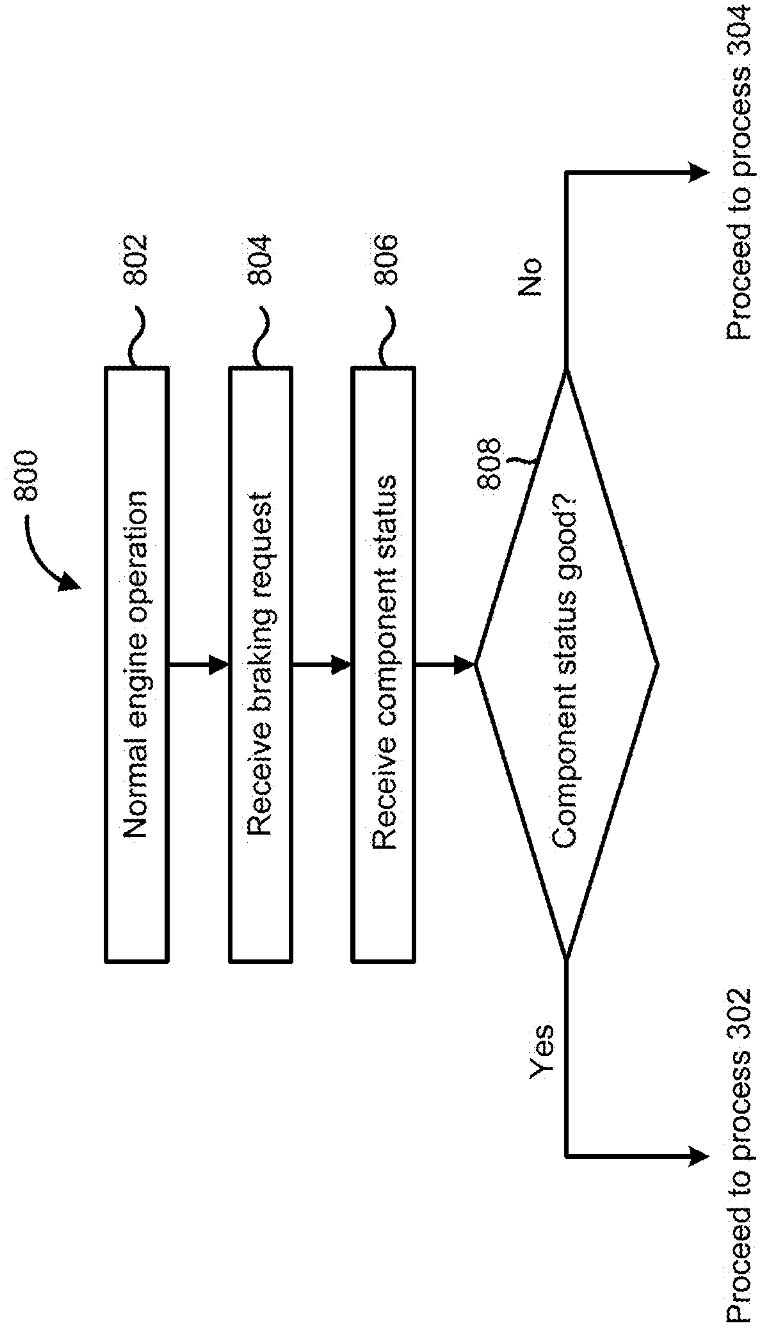
FIG. 7 is a flow diagram of a method of enabling an engine braking operation, according to another example embodiment.

Now referring to FIG. 7, a flow diagram of a method 800 of enabling an engine braking operation is shown, according to an example embodiment. In particular, the controller 140 is structured to enable the engine braking operation based on a status of a component of the aftertreatment system 120, such as a heater and particularly an aftertreatment system heater (which may have a variety of structures, such as an electric heater, a grid heater, etc.). It should be understood that the order of the method 800 is shown as an example only. That is, one or more processes may be performed concurrently, partially concurrently, sequentially, and/or in a different order than as shown in FIG. 7. Further, some processes of the method 800 may be omitted while other processes may be added to the method 800. The method 800 may be performed periodically and/or dynamically responsive to changes in, for example, information received from the sensors 125. Advantageously, using the method 800, the controller 140 is configured to facilitate selecting and implementing an engine braking mode based on/in response to determining the status of a component of the aftertreatment system 120, such as a heater.

At process 802, the controller 140 enables normal engine operation of the engine 102. At process 804, the controller 140 receives a braking request. At process 806, the controller 140 receives a SOC value of the battery 132. In some embodiments, the controller 140 may receive a component status regarding a component of the aftertreatment system 120, such as a heater status of a heater (e.g., an aftertreatment system heater). The component status may include, for example, an indication of one or more active fault codes associated with the component. In some embodiments, when the component is an electrical component, such as an electric heater, the component status includes the battery SOC value. In other embodiments, when the component is a fuel consuming component, such as a fuel consuming heater (e.g., a gas-powered heater), the component status includes an indication of an amount of fuel available to the fuel consuming component.

At process 708, the controller 140 determines whether the component status is acceptable or not. The controller 140 determines that the component status is acceptable based on the component status satisfying a predefined criteria or criterion. The controller 140 determines that the component status is not acceptable based on the component status not satisfying the predefined criteria or one or more criterion. For example, the controller 140 may determine that the component status is acceptable responsive to at least one of (i) the component status indicating that there are no active faults associated with the component (or that the number or severity of the active faults is below a predetermined threshold), (ii) the component status indicating that the battery SOC value is at or above a predetermined SOC threshold, or (iii) the component status indicating that the amount of fuel available is at or above a predetermined fuel threshold. In an example operating scenario, the controller 140 may determine that the component status of an electric heater in the aftertreatment system 120 is acceptable responsive to at least one of (i) the component status indicating that the number of active faults associated with the electric heater is at or below a predefined threshold or (ii) the component status indicating that the battery SOC value is at or above a predetermined SOC threshold, such that the electric heater can draw electrical energy from the battery 132. Responsive to determining that the component status is acceptable, the controller 140 may proceed to process 302 of the method 300.

The controller 140 may determine that the component status is not acceptable responsive to at least one of (i) the component status indicating that there are active faults associated with the component (or that the number or severity of the active faults is at or above a predetermined threshold), (ii) the component status indicating that the battery SOC value is below a predetermined SOC threshold, or (iii) the component status indicating that the amount of fuel available is below a predetermined fuel threshold. In an example operating scenario, the controller 140 may determine that the component status of an electric heater in the aftertreatment system 120 is not acceptable responsive to at least one of (i) the component status indicating that the number of active faults associated with the electric heater is above the predefined threshold or (ii) the component status indicating that the battery SOC value is below the predetermined SOC threshold, such that the electric heater cannot draw electrical energy from the battery 132 (e.g., without disrupting the function of other electrical devices of the system 100). Responsive to determining that the component status is not acceptable, the controller 140 may proceed to process 304 of the method 300.

In any of the above-described embodiments, including the method 300, the method 600, the method 700 and/or the method 800, the engine braking operation may be integrated with other features and/or operations to increase the temperature of the aftertreatment system 120 and/or mitigate temperature reduction in the aftertreatment system 120. For example, one or more operations to increase the temperature of the aftertreatment system 120 and/or mitigate temperature reduction in the aftertreatment system 120 may include activating an electric heater, deactivating one or more cylinders 104, and/or other suitable operations to increase the temperature of exhaust gases flowing through the aftertreatment system 120. In some embodiments, the controller 140 is configured to enable the one or more operations to increase the temperature of the aftertreatment system 120 and/or mitigate temperature reduction in the aftertreatment system 120 prior to using one or more of the method 300, the method 600, the method 700, and/or the method 800 to enable an engine braking operation. In other embodiments, the controller 140 is configured to use one or more of the method 300, the method 600, the method 700, and/or the method 800 to enable an engine braking operation prior to enabling the one or more operations to increase the temperature of the aftertreatment system 120 and/or mitigate temperature reduction in the aftertreatment system 120. For example, the controller 140 may implement the one or more operations to increase the temperature of the aftertreatment system 120 and/or mitigate temperature reduction in the aftertreatment system 120 responsive to determining that the temperature in the aftertreatment system 120 is at or below a predetermined threshold and/or that a change in temperature in the aftertreatment system 120 is at or below a predetermined threshold.

In some embodiments, the controller 140 may switch between the engine braking modes and/or other engine operating modes, such as a normal operating mode, to mitigate wear on the engine 102 caused by engine vibrations during the engine braking operation.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 3, it should be understood that the controller 140 may include any number of circuits for completing the functions described herein. For example, the activities and functionalities of the engine braking control circuit 212 and/or the regenerative braking control circuit 214 may be combined in multiple circuits or as a single circuit. Additional circuits with additional functionality may also be included. Further, the controller 140 may further control other activity beyond the scope of the present disclosure.

As mentioned above and in one configuration, the "circuits" may be implemented in machine-readable medium for execution by various types of processors, such as the processor 204 of FIG. 3. Executable code may, for instance, comprise one or more physical or logical blocks of computer instructions, which may, for instance, be organized as an object, procedure, or function. Nevertheless, the executables need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits and may be embodied in any suitable form and organized within any suitable type of data structure. The operational data may be collected as a single data set or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud-based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud-based server). To that end, a "circuit" as described herein may include components that are distributed across one or more locations.

Embodiments within the scope of the present disclosure include program products comprising computer or machine-readable media for carrying or having computer or machine-executable instructions or data structures stored thereon. Such machine-readable media can be any available media that can be accessed by a computer. The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device. Machine-executable instructions include, for example, instructions and data which cause a computer or processing machine to perform a certain function or group of functions.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more other programming languages, including an object-oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the apparatus and system as shown in the various exemplary embodiments is illustrative only. Additionally, any element disclosed in one embodiment may be incorporated or utilized with any other embodiment disclosed herein.

What is claimed is:

1. A system comprising:

an aftertreatment system fluidly coupled to an engine; and a controller communicably coupled to the engine and the aftertreatment system, the controller comprising at least one processor coupled to at least one memory device storing instructions that, when executed by the at least one processor, cause the controller to perform operations comprising:

receiving an engine braking request;

responsive to receiving the engine braking request, enabling an engine braking operation whereby at least one engine braking mode of a plurality of engine braking modes is enabled and implemented;

receiving a temperature value regarding a temperature of the aftertreatment system;

comparing the temperature value to a first threshold or a second threshold, the first threshold greater than the second threshold; and selecting and implementing one of the plurality of engine braking modes based on comparing the temperature value to the first threshold or the second threshold.

2. The system of claim 1, wherein the temperature of the aftertreatment system is at least one of an exhaust gas temperature, an oxidation catalyst temperature value, a selective catalytic reduction catalyst temperature value, and/or a particulate filter temperature value.

3. The system of claim 1, wherein the first threshold is at least one of a predetermined threshold, a dynamic threshold, or a predicted threshold.

4. The system of claim 1, wherein the first threshold is determined based on route data of the system comprising at least one of upcoming traffic, road grade, or weather conditions.

5. The system of claim 1, wherein:

the plurality of engine braking modes comprises a first engine braking mode, a second engine braking mode, and a third engine braking mode.

6. The system of claim 5, wherein selecting one of the plurality of engine braking modes comprises selecting the first engine braking mode responsive to the temperature value being at or above the first threshold.

7. The system of claim 5, wherein selecting one of the plurality of engine braking modes comprises selecting the second engine braking mode responsive to the temperature value being below the first threshold and the temperature value being at or above the second threshold.

8. The system of claim 5, wherein selecting one of the plurality of engine braking modes comprises selecting the third engine braking mode responsive to the temperature value being below the first threshold and the temperature value being below the second threshold.

9. The system of claim 5, wherein the operations further include:

receiving a braking power demand value regarding a braking power for the engine braking operation; and comparing the braking power demand value to a first braking power threshold or a second braking power threshold;

wherein selecting one of the plurality of engine braking modes is further based on comparing the braking power demand value to the first braking power threshold or the second braking power threshold.

10. The system of claim 9, wherein selecting one of the plurality of engine braking modes comprises selecting the first engine braking mode responsive to the braking power demand value being at or above the first braking power threshold.

11. The system of claim 9, wherein selecting one of the plurality of engine braking modes comprises selecting one of the second engine braking mode or the third engine braking mode responsive to the temperature value being below the first threshold, the temperature value being at or above the second threshold, the braking power demand value being below the first braking power threshold, and the braking power demand value being at or above the second braking power threshold.

12. The system of claim 9, wherein:

the first braking power threshold corresponds to one of a second braking power value associated with the second engine braking mode or a third braking power value associated with the third engine braking mode; and the second braking power threshold corresponds to the other of the second braking power value or the third braking power value.

13. The system of claim 12, wherein the operations further include receiving an engine speed value regarding a speed of the engine, wherein:

the first braking power threshold corresponds to the second braking power value and the second braking power threshold corresponds to the third braking power value when the engine speed value is at or above a speed threshold; and the first braking power threshold corresponds to the third braking power value and the second braking power threshold corresponds to the second braking power value when the engine speed value is below the speed threshold.

14. A method comprising:

receiving, by a controller, an engine braking request for an engine;

responsive to receiving the engine braking request, enabling an engine braking operation whereby at least one engine braking mode of a plurality of engine braking modes is enabled and implemented;

receiving, by the controller, a braking power demand value regarding a braking power for the engine braking operation;

identifying, by the controller, one or more engine braking modes of the plurality of engine braking modes, the one or more engine braking modes satisfying the braking power demand value;

receiving, by the controller, a temperature value regarding a temperature of an aftertreatment system, the aftertreatment system coupled to the engine;

comparing, by the controller, the temperature value to a first threshold or a second threshold, the first threshold greater than the second threshold; and selecting and implementing, by the controller, one of the one or more engine braking modes based on comparing the temperature value to the first threshold or the second threshold.

15. The method of claim 14, further comprising receiving an engine speed value regarding a speed of the engine;

wherein identifying the one or more engine braking modes that satisfy the braking power demand value comprises one of:

determining that a first engine braking mode of the plurality of engine braking modes satisfies the braking power demand value responsive to the braking power demand value being at or above a first braking power threshold;

determining that a second engine braking mode of the plurality of engine braking modes satisfies the braking power demand value responsive to the braking power demand value being below the first braking power threshold, the braking power demand being at or above a second braking power threshold, and the engine speed value being at or above a speed threshold; or determining that a third engine braking mode of the plurality of engine braking modes satisfies the braking power demand value responsive to the braking power demand value being below the first braking power threshold, the braking power demand being at or above the second braking power threshold, and the engine speed value being below the speed threshold.

16. The method of claim 15, wherein identifying the one or more engine braking modes that satisfy the braking power demand value further comprises determining that each of the first engine braking mode, the second engine braking mode, and the third engine braking mode satisfy the braking power demand value responsive to the braking power demand value being below the first braking power threshold and the braking power demand being below the second braking power threshold.

17. The method of claim 16, wherein selecting one of the one or more engine braking modes based on comparing the temperature value to the first threshold or the second threshold comprises one of:

selecting the first engine braking mode responsive to the temperature value being at or above the first threshold;

selecting the second engine braking mode responsive to the temperature value being below the first threshold and at or above the second threshold and the second engine braking mode satisfying the braking power demand value;

selecting the third engine braking mode responsive to the temperature value being below the first threshold and below the second threshold and the third engine braking mode satisfying the braking power demand value.

18. A non-transitory computer-readable medium storing instructions that, when executed by one or more processors of a processing circuit, cause the processing circuit to perform operations comprising:

receiving an engine braking request for an engine;

receiving a braking power demand value regarding a braking power for the engine braking operation;

receiving one or more engine braking modes of a plurality of engine braking modes, the one or more engine braking modes satisfying the braking power demand value;

receiving a temperature value regarding a temperature of an aftertreatment system, the aftertreatment system coupled to the engine; and selecting and implementing one of the one or more engine braking modes based on comparing the temperature value to a first threshold or a second threshold, the first threshold greater than the second threshold.

19. The non-transitory computer-readable medium of claim 18, wherein the instructions, when executed by the one or more processors, cause the processing circuit to perform further operations comprising receiving an engine speed value regarding a speed of the engine, wherein receiving the one or more engine braking modes of the plurality of engine braking modes is responsive to one of:

determining that a first engine braking mode of the plurality of engine braking modes satisfies the braking power demand value responsive to the braking power demand value being at or above a first braking power threshold;

determining that a second engine braking mode of the plurality of engine braking modes satisfies the braking power demand value responsive to the braking power demand value being below the first braking power threshold, the braking power demand being at or above a second braking power threshold, and the engine speed value being at or above a speed threshold; or determining that a third engine braking mode of the plurality of engine braking modes satisfies the braking power demand value responsive to the braking power demand value being below the first braking power threshold, the braking power demand being at or above the second braking power threshold, and the engine speed value being below the speed threshold.

20. The non-transitory computer-readable medium of claim 19, wherein selecting one of the one or more engine braking modes based on comparing the temperature value to the first threshold or the second threshold comprises one of:

selecting the first engine braking mode responsive to the temperature value being at or above the first threshold;

selecting the second engine braking mode responsive to the temperature value being below the first threshold and at or above the second threshold and the second engine braking mode satisfying the braking power demand value; or selecting the third engine braking mode responsive to the temperature value being below the first threshold and below the second threshold and the third engine braking mode satisfying the braking power demand value.

* * * * *